June 14, 1938.  E. BREITLING  2,120,390

BOOKKEEPING MACHINE

Filed Sept. 4, 1934  15 Sheets-Sheet 1

Inventor
Ernst Breitling
By
His Attorney

June 14, 1938.　　　E. BREITLING　　　2,120,390
BOOKKEEPING MACHINE
Filed Sept. 4, 1934　　15 Sheets-Sheet 2

Inventor
Ernst Breitling
By Carl Benst
His Attorney

June 14, 1938.                E. BREITLING                 2,120,390
                            BOOKKEEPING MACHINE
                         Filed Sept. 4, 1934        15 Sheets-Sheet 3
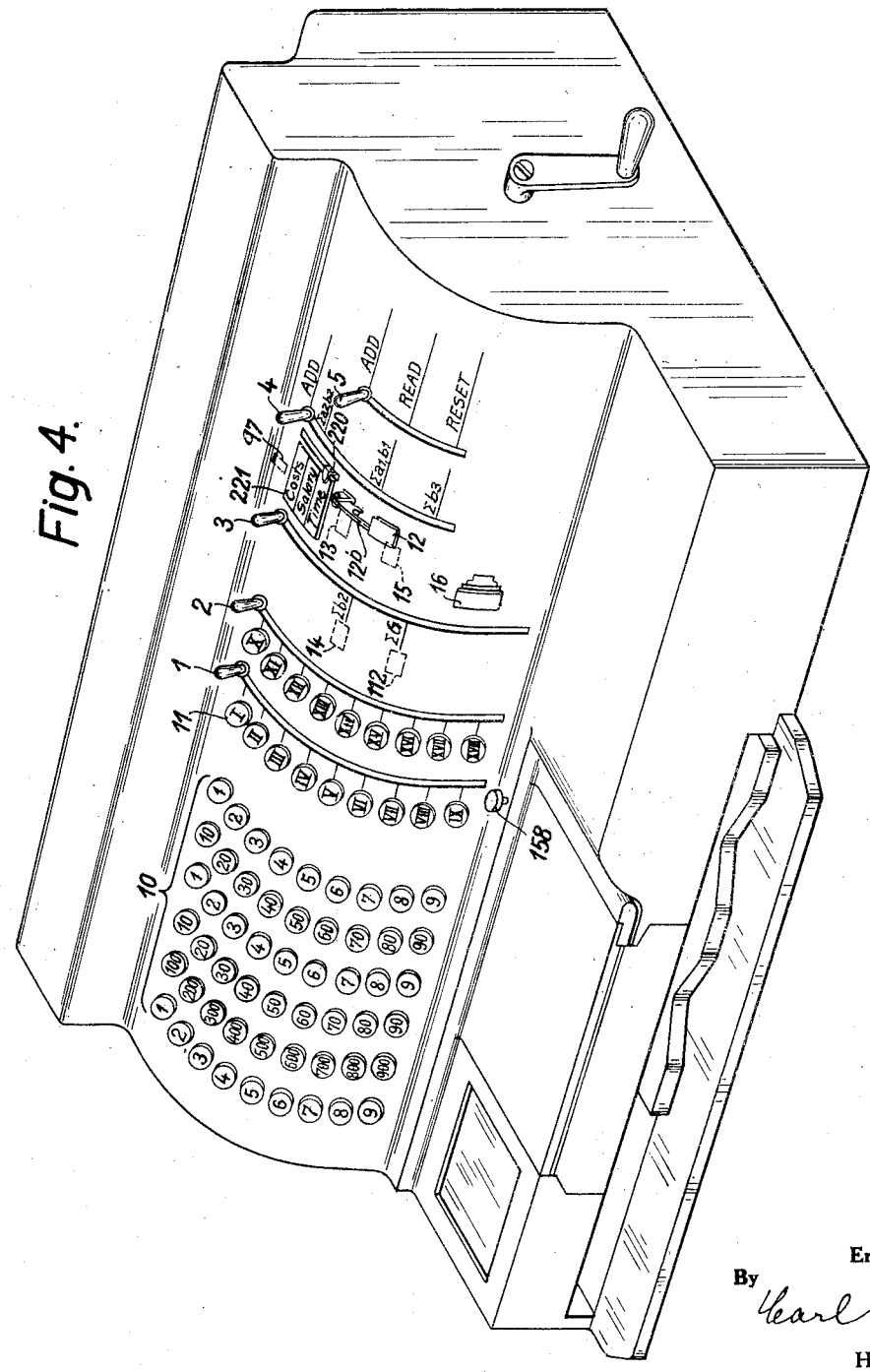
Inventor
Ernst Breitling
By  Earl Beust
His Attorney

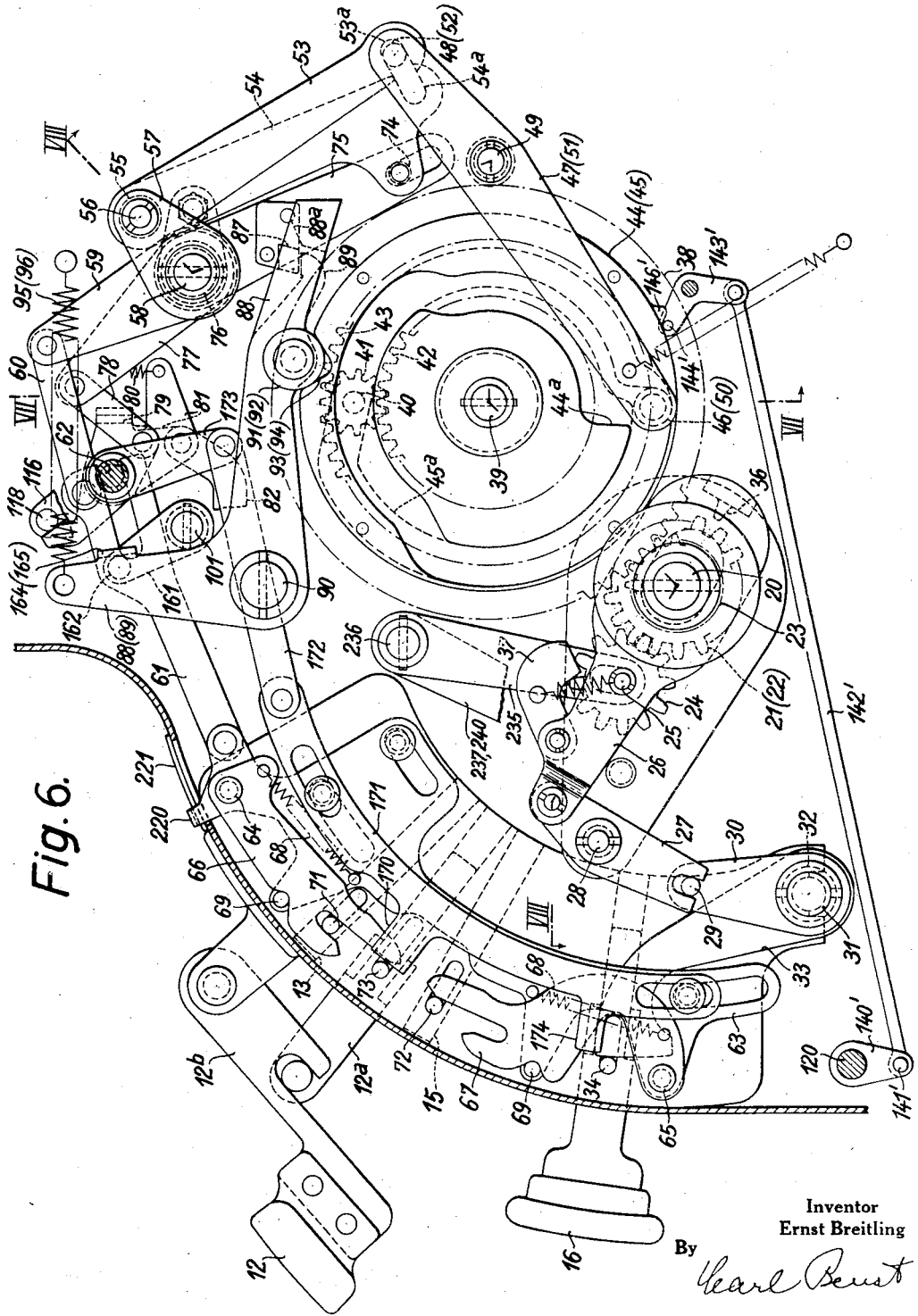

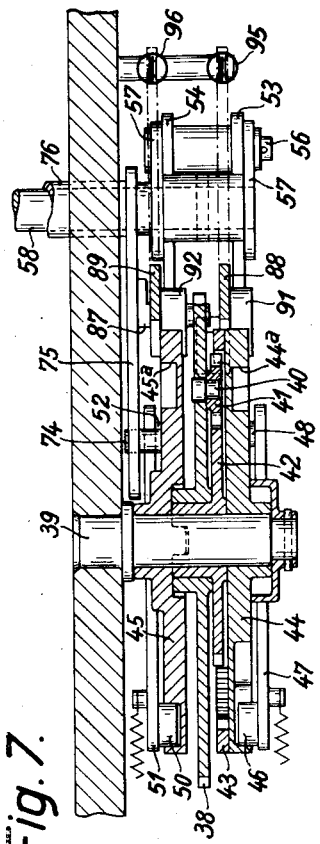
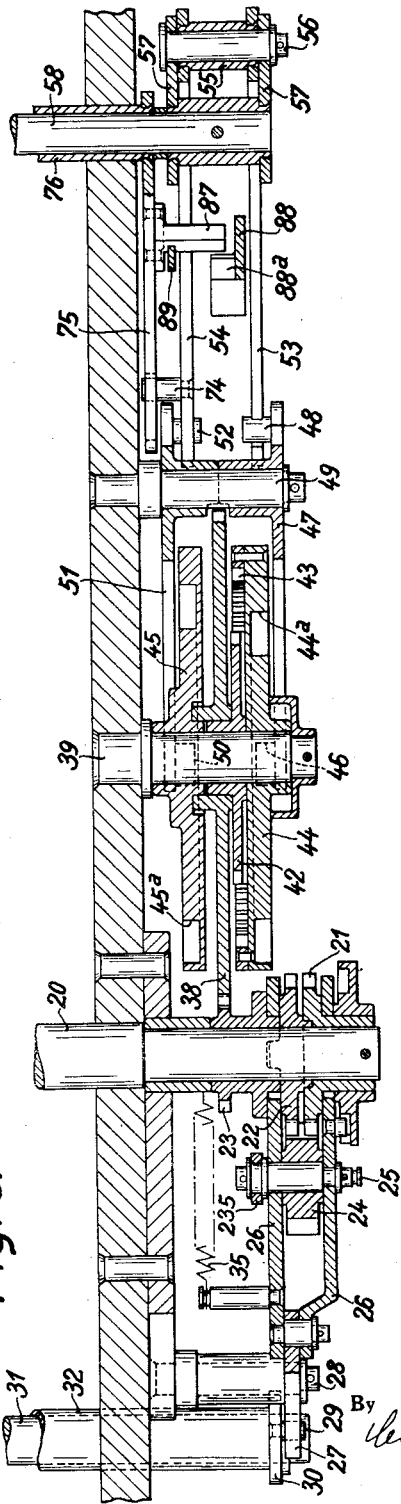

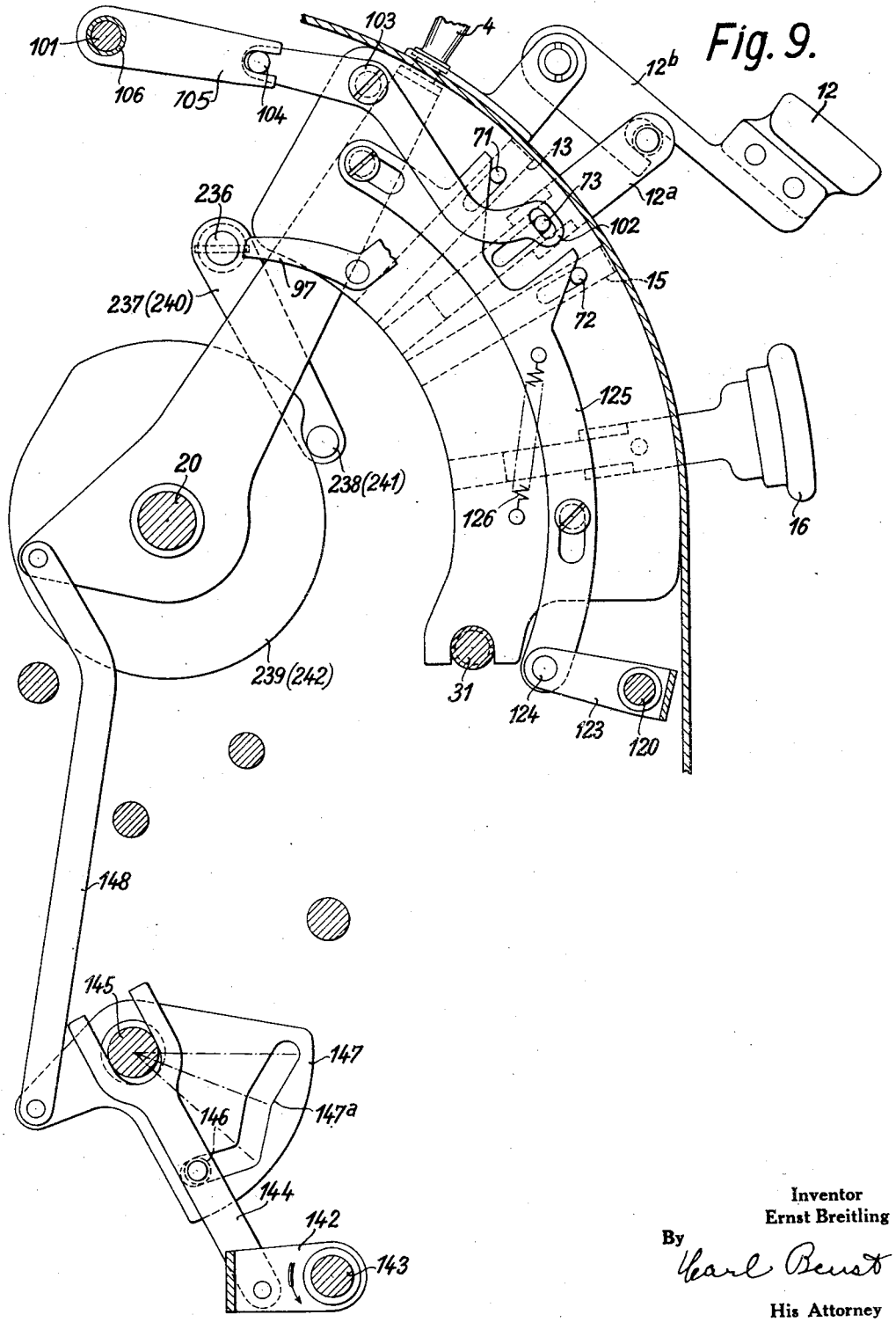

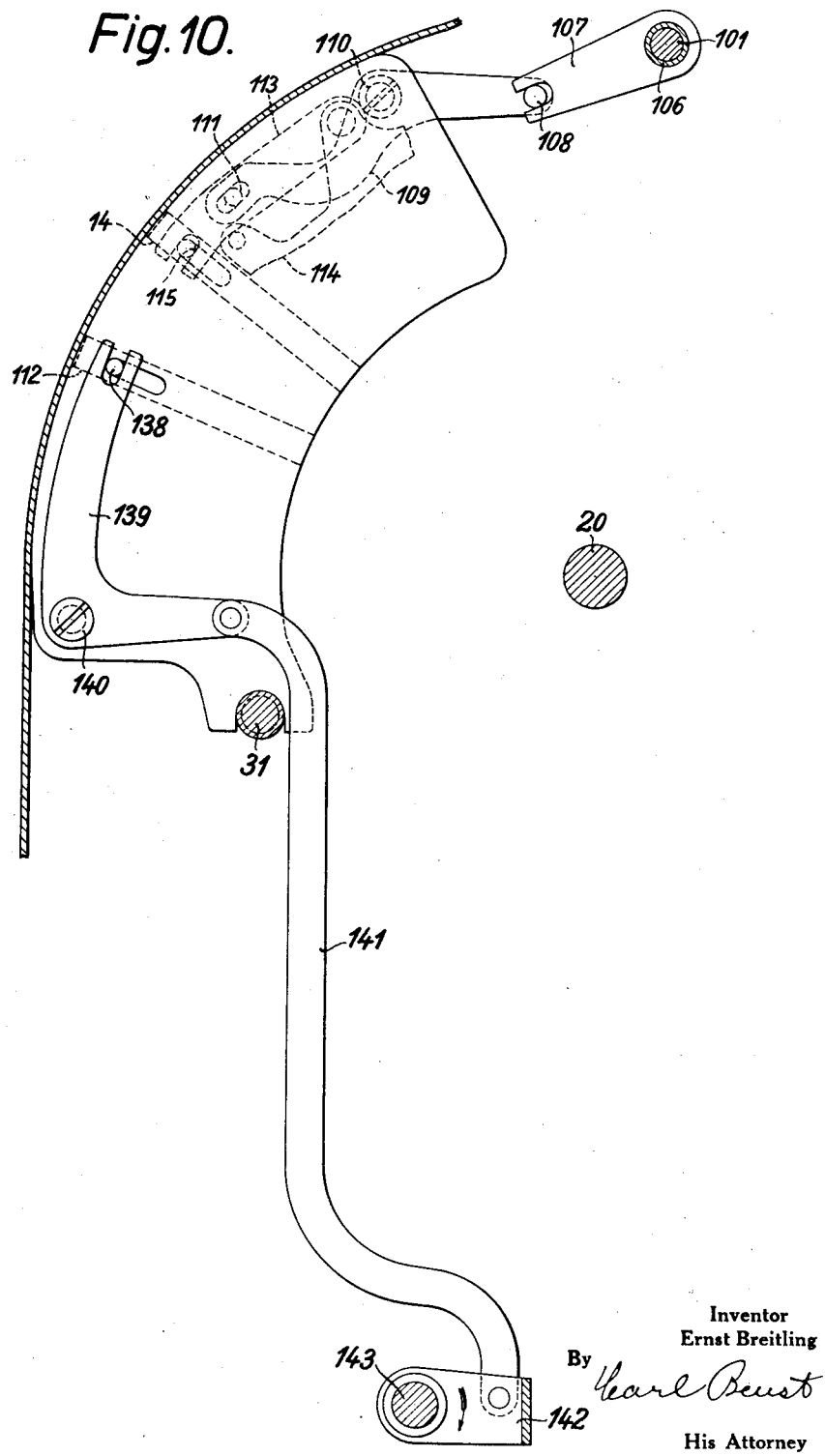

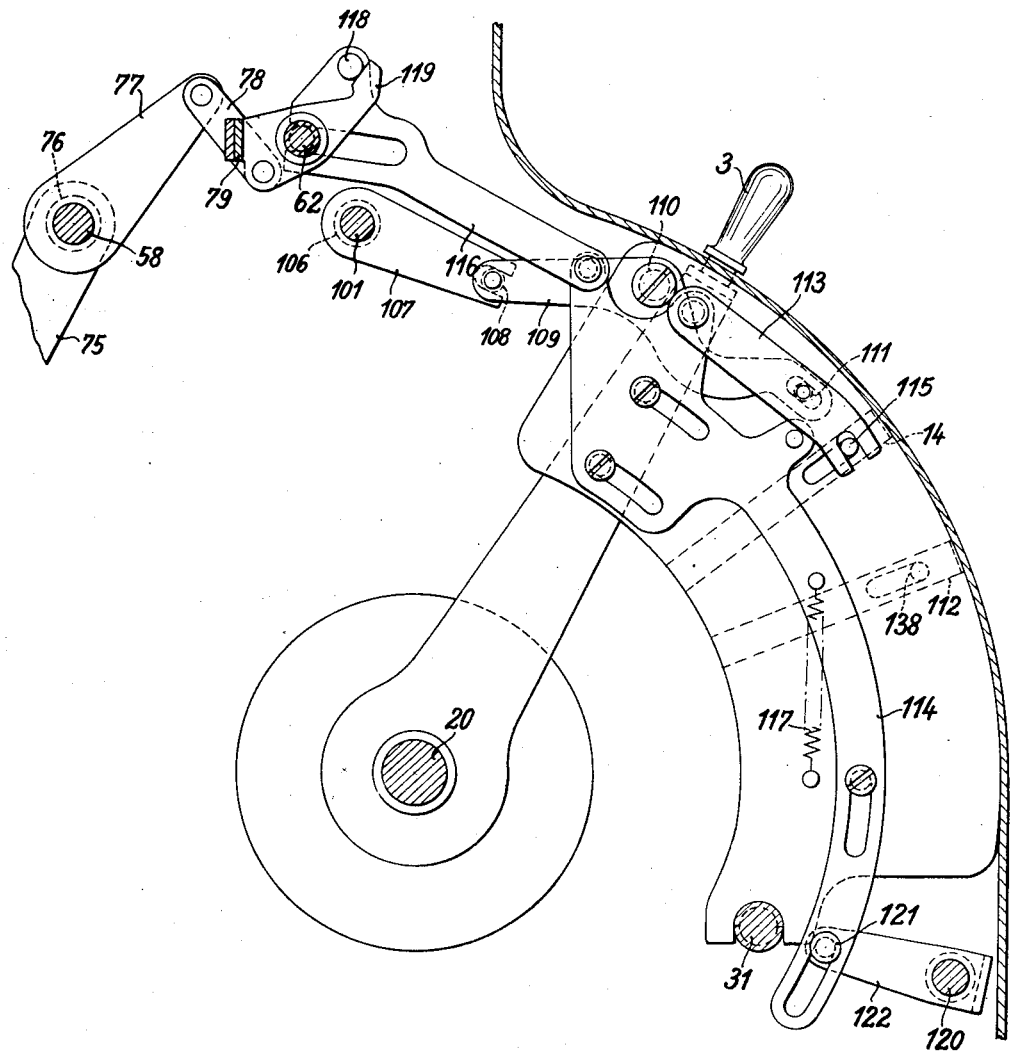

June 14, 1938.  E. BREITLING  2,120,390
BOOKKEEPING MACHINE
Filed Sept. 4, 1934    15 Sheets-Sheet 12

Inventor
Ernst Breitling
By *Carl Beust*
His Attorney

June 14, 1938.    E. BREITLING    2,120,390
BOOKKEEPING MACHINE
Filed Sept. 4, 1934    15 Sheets-Sheet 15

Inventor
Ernst Breitling
By Pearl Benst
His Attorney

Patented June 14, 1938

2,120,390

UNITED STATES PATENT OFFICE 2,120,390

BOOKKEEPING MACHINE

Ernst Breitling, Essen-on-the-Ruhr, Germany, assignor, by mesne assignments, to The National Cash Register Co., Dayton, Ohio, a corporation of Maryland Application September 4, 1934, Serial No. 742,540
In Germany September 8, 1933

19 Claims. (Cl. 235—6)

This invention relates to an auditing machine and is illustrated to carry out a system for analyzing production costs, such as time consumed, salaries and overhead.

In most business there are two general classes of work, that is, work which in which the overhead costs are constant and in analyzing the cost only the time and the salary must be considered. In such a transaction only two entries are made to complete the series of entries. For convenience in description this series of entries will be known herein as series A.

A second general class of work is one in which the overhead is variable and in this class three entries are necessary to complete a series of entries to enter the production cost. Such a transaction includes time, salary and overhead. This transaction will be known herein as series B.

The principal object of the present invention is to provide a mechanism to automatically control the entries of each series in a regular order, and also with a means that makes it necessary to complete the series A or B before another series can be started.

The invention moreover provides an accounting machine for registering salaries in several series of transactions, and this in such a way that the machine records in one series (A) items of work with constant overheads (manual items) and in the other series (B) items of work with variable overheads (mechanical items). Since in a business the cost of any activity of a worker is almost always calculated from the working time and the salary per unit of time (basic salary), the results obtained by such a machine constitute an important basis for a later, temporary and final calculation of expenditure on the different items of work, and these results also give an analysis of salaries for each individual item of work, for groups of items of work or of workers, for parts of the business, etc. In most cases it is necessary to distinguish in the calculation between at least two groups of items of work. For manual items of work it is generally sufficient, in order to obtain the total costs, to add to the salary calculated from the time and the basic salary a supplement which is constant in absolute value or is a constant percentage of the salary so calculated. The case is different when the work is effected mechanically, since the different overhead expenses (driving power, maintenance, depreciation, etc.) must be added, so that their total can no longer be calculated from the number of salary-record transactions or from a percentage of the grand total of such transactions.

It is therefore preferable to record the overheads separately when calculating the salaries for mechanical items of work. The series of manual transactions (A) requires only two transactions (time $a_1$ and salary $a_2$—with or without a constant supplement), whereas the series (B) for the mechanical items of work comprises three transactions (time $b_1$, salary $b_2$ and overheads $b_3$). Totalizers are provided for estimating the numerical values of these transactions, which totalizers are disposed in such a way that the total of each kind of transaction is given separately. Under certain circumstances, however, the grand total of similar transactions $a_1$, $b_1$, $a_2$, $b_2$, of each series (A, B) may be desired so that the totalizers must be so engaged that they show the totals $\Sigma a_1$, $b_1 \Sigma b_1$, $a_2$, $b_2$, $\Sigma b_2$, $\Sigma b^3$.

The items of work may be further divided according to the kind and departments of the business. It is particularly desirable in the case of manual items of work, to accumulate separately the amounts of salary paid to workmen of different callings, e. g. locksmiths, smiths and so on, in totalizers which are not engaged when dealing with mechanical items of work (series B). In this case it is possible to employ the setting members for these particular transactions for the selection of the two series (A, B), and this in such a manner that the depression of control keys selects the series of transactions (A) for manual items of work, whereas the series (B) for mechanical items of work is selected when the control keys are not depressed.

As regards the control member which automatically selects the different transactions of a series, said member may be formed as a key slide, in which case the different transactions are most conveniently set by the depression of different keys (for instance for the selection of different totalizers) or alternatively the machine may comprise a control member of special shape disposed in the vicinity of the driving member, which control member transforms the constant drive in such a way that the desired transaction is recorded.

In the accompanying drawings are illustrated two practical embodiments of the present invention; in the first of which the control member comprises a key slide applied to a machine giving separate totals for each kind of transaction ($a_1$, $a_2$ $b_1$—$b_3$), whereas in the second embodiment the control member is constituted by grooved cams disposed in the vicinity of the driving member and gives, with the same number of totalizers, combined totals from the various kinds of transactions.

The control member in the first embodiment is furthermore so designed that the different transactions are determined by virtue of the shape thereof for the following sequences $a_1, b_1, a_2, b_2, b_3$ or $a_1, a_2, b_1, b_2, b_3$. To this end the surface of the control member is divided into two parts, each corresponding to one of the series (A, B) and the displacement of the control member increases within each series, by increments of substantially the same size at each transaction. The control member requires a displacement equal to the sum of the increments corresponding to all the transactions of a series, before it will permit the next series to be initiated.

In the second embodiment, on the contrary, a separate control cam is provided for each series, which member is coupled with the machine drive and is selected by the positioning member determining the first operation in the series. It is necessary after the last machine operation of a series to return the selected control cam to its initial position (e. g. by spring action) or else so to determine the increments of displacement of the cam that the cam has executed one or more complete revolutions after it has received the full number of increments of displacement for the series.

According to a further feature of the invention the machine includes an index device, the construction of which varies with the control system used, for indicating the nature of the next succeeding machine operation.

Finally the invention provides a device for automatically coupling together several series of transactions (A, B) which operates by reason of the fact that the last machine operation ($a_2$) of one series (A) automatically sets the machine to record another series (B), and this by the return movement of the setting number determining that series.

The drawings show an accounting machine for registering salaries, with recording of manual items of work ($a_1, a_2$) and of mechanical items of work ($b_1, b_2, b_3$), in two different series of transactions (A, B) of which two examples are shown which differ as regards control mechanism and arrangement of totalizers.

With this and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 4 shows the keyboard of the machine according to the second embodiment;

Fig. 6 is a vertical section showing the motor key bank and control members of the machine shown in Fig. 4;

Fig. 7 is a section along the line VII—VII in Fig. 6;

Fig. 8 is a section through the control members, taken along the line VIII—VIII in Fig. 6;

Fig. 9 is a section through the motor key bank, taken along the line IX—IX in Fig. 14;

Fig. 10 is a section taken along the line X—X in Figs. 13 and 15;

Fig. 11 is a section taken along the line XI—XI in Figs. 13 and 15;

The keyboard in both embodiments (Figs. 1 and 4) comprises amount-keys 10 and two rows of control keys 11, the latter being used for the selection of auxiliary totalizers I—XVIII (Figs. 3 and 5) in which the salaries calculated from the series of transactions for manual items of work are subdivided according to the callings of the workmen employed. Each row of keys is provided with a totalizer lever 1 or 2, which is operable to take totals from the totalizers, each of which accumulates the manual work salaries associated with a different calling; the levers 1 and 2 serving to engage the totalizers in question.

Figure 1:
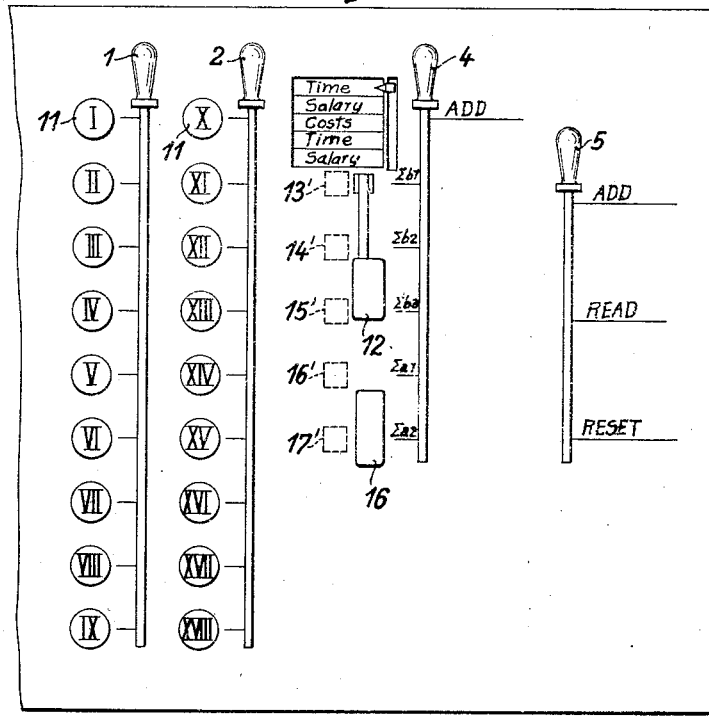
Fig. 1 shows the keyboard of the machine according to the first embodiment.

Referring now to Fig. 1, there is provided a motor key 12 and a plurality of keys without heads consisting of stems $13^1$—$17^1$ and their corresponding key studs only. The key stems $13^1$ to $17^1$ determine the different transactions $a_1, a_2, b_1$—$b_3$, to be recorded, and thereby select the totalizers which accumulate the numerical values of these transactions: The key stem $13^1$ corresponds to the totalizer for mechanical work times ($b_1$), the stem $14^1$ to the totalizer for mechanical work salaries ($b_2$), the stem $15^1$ to the mechanical work overheads ($b_3$), the stem $16^1$ to the totalizer for the manual work times ($a_1$), and the stem $17^1$ to the manual work salaries ($a_2$). The last may also accumulate the manual work overheads. A lever 4 selects these totalizers for total taking, which lever may also be arranged to simultaneously transform the machine from the amount-entering condition to the zeroizing condition. The total taking member proper is the mode of operation lever 5, which has three positions of adjustment, viz. "add," "read," and "reset," and which—in the case when the lever 4 acts as a selecting lever for the totalizers only—must be displaced when it is desired to "read" or to "reset" any of the totalizers. A further motor key 16 is used for "idle" or zero amount machine operations, which key must be used as well for initiating the drive during total taking operations, as the motor key 12 normally actuates one of the keys $13^1$—$17^1$ and no mechanism is provided for eliminating this action in total taking operations.

The totalizers are arranged in three rows corresponding to the three key banks (Fig. 3); they are moved by the control mechanism of said rows until the selected totalizers stand opposite the differential members of the amount banks.

A slide $19^1$ (Fig. 2) cooperates with the key stems $13^1$ to $17^1$ of the embodiment shown in Fig. 1, and this slide may be positioned in five positions, in each of which it cooperates with one of the key stems. The slide $19^1$ is guided by means of slots $20^1$, which cooperate with studs $21^1$ supported by a second slide $22^1$ which is movable in the lengthwise direction of the key stems. The slide $19^1$ is provided with projections $23^1$ which cooperate with corresponding studs $24^1$ on the key stems $13^1$ to $17^1$. The distance between the projections $23^1$ is so determined that initially a projection $23^1$ is opposite the key stem $13^1$ and then, in the course of the stepwise movement of the slide to the left, the key stems $14^1$, $15^1$, $16^1$ and $17^1$ are successively selected. The second slide $22^1$ is also formed with slots $25^1$ and is guided on studs $26^1$, and is held in its rest position by springs $27^1$. A projection $18^1$ on the slide $22^1$ connects the latter with the motor key 12.

As stated above, the sections $s_1$—$s_3$ of the slide $19^1$ correspond to the booking series B and the sections $s_4$, $s_5$, to the booking series A. The arrangement is such that in the rest position of the slide $19^1$ the first projection $23^1$ from the top lies opposite the stud $24^1$ of the key stem $13^1$ and causes this key stem $13^1$ which corresponds to the transaction $b_1$ of series B to be depressed when the motor key 12 is depressed. For the following operations $b_2$, $b_3$, of series B, the slide $19^1$ is advanced by one step, and the second projection $23^1$ selects the key stem $14^1$ for operation $b_2$ (mechanical salaries), and the third projection $23^1$ selects the key stem $15^1$ for operation $b_3$ (mechanical overheads), when the motor key 12 is depressed. At the end of the third operation $b_3$, the slide $19^1$ is automatically returned to its initial position.

The series A for manual items of work begins at the fourth position of the slide $19^1$ only, and for effecting it it is necessary to displace the setting means $19^1$ corresponding to this section from the zero position to the fourth position and this is done by depressing one of the control keys 11. The corresponding arrangement is shown in dotted lines in Fig. 2. Each row of control keys 11 cooperates with a slide $28^1$ articulated to pivoted levers $29^1$. The upper ends of the slides are connected to a common link $30^1$ which, in the rest position, abuts against the lever $31^1$. The lever $31^1$ controls the position of the slide $19^1$ by means of an arm $32^1$ and is moved by the link $30^1$ to displace the slide $19^1$ by two steps into the position 3, when one of the keys 11 is depressed. The control lever $31^1$ cooperates with a grooved cam $33^1$ which is rotated by the machine drive through one revolution during a series of transactions (A or B). The cam $33^1$ comprises two grooves $34^1$, $35^1$, cooperating with the stud $36^1$ of the lever $31^1$; the outside groove ($34^1$) corresponds to the series B and the inside groove ($35^1$) to the series A. Owing to the fact that three operations $b_1$, $b_2$, $b_3$, belong to series B, the cam $33^1$ is controlled in the manner described later on with reference to the second embodiment, so that at each transaction it makes $\frac{1}{3}$ of a complete revolution. At the end of each transaction, the stud $36^1$ is displaced inwardly by a distance corresponding to unit movement of the slide $19^1$. The inner groove $35^1$ controls the transactions $a_1$, $a_2$ of series A for manual items of work, and this groove cooperates with the stud $36^1$ when a control key has been actuated, the stud $36^1$ being displaced by two units by the slide $28^1$. The control keys 11 also cause the drive of the cam to be changed in such a manner that now half a revolution is given for each of the transactions $a_1$, $a_2$ of the series A. At the end of said series, a spring $37^1$ returns the stud $26^1$ and its lever $31^1$ to its initial position corresponding to the series B and this is possible with no more action taken, as the control keys 11 are released at the end of the last transaction.

The second embodiment, shown in Figs. 4 to 18, also relates to a machine for registering manual and mechanical items of work in two series of transactions A, B having two ($a_1$, $a_2$) and three ($b_1$, $b_2$, $b_3$) machine operations respectively; and two totalizers ($a_1 b_1$, $a_2 b_2$) for the grand totals of times and salaries and two special totalizers ($b_2$, $b_3$) for mechanical work salaries and mechanical overheads. For the mechanical work time transactions $b_1$ no totalizer is provided. The arrangement of the amount keys and of the control keys is the same as that shown in Fig. 1. To the right hand of the control keys 11 is mounted a bank in which a key stem 14 may be selected by means to be described later on, which key stem selects the totalizer $b_2$ for mechanical work salaries when entering amounts. For zeroizing a lever 3 is provided to throw in this totalizer. In the following row is provided a key stem 13 for the totalizer $a_1 b_1$ for the grand total of times, a key stem 15 for the totalizer $b_3$ for mechanical overheads, and a zero-stop lever 17 which acts as a key stem, and which in its normal non-rocked position selects the totalizer $a_2 b_2$ for the grand total of salaries, which totalizer is mounted in the zero position of the totalizer row (see Fig. 5). For total taking, corresponding positions of the lever 4 are provided, which positions effect the total taking from the totalizers in conjunction with the actuation of a special motor key 16. The other motor key 12 is only used to release the machine for the operations $a_1$, $a_2$ and $b_1$, $b_2$, $b_3$.

The operation of the embodiment illustrated in Figs. 4 to 18 is as follows:—

As stated in the preamble, in the calculation of salaries (e. g. on a farm), two main groups of salaries must be considered: the manual work salaries, in which a constant supplement for overheads is included, and the mechanical work salaries to which a variable supplement for overheads must be added. In the series B for recording salaries of the second kind, the working time is first recorded by means of the amount keys 10 and the motor key 12, whereby the grand totalizer for time $a_1 b_1$ (Figs. 4 and 5) is selected. During the second operation $b_2$ of this series, which is released after setting the amount of salary, by depressing the motor key 12, the amount of salary for mechanical items of work $b_2$ is accumulated into the grand totalizer for salary $a_2 b_2$ and into the totalizer for mechanical salaries $b_2$. Finally, the amount of overheads is set and the machine is released for the third operation $b_3$ by depressing the motor key 12, so that the set amount is accumulated in the totalizer $b_3$.

In the case of series A for the salaries with constant overheads, the time is first set by means of the amount keys; furthermore, one of the control keys 11 is depressed to select the totalizer of the corresponding calling (locksmith, smith, painter and so on) and by depressing the motor key 12 the first operation $a_1$ is released, so that the time is accumulated in the grand totalizer for time $a_1 b_1$. In the following transaction $a_2$, the amount of salary is accumulated, by actuating the amount keys 10 and the motor key 12, in the grand totalizer for salary $a_2 b_2$ and in the selected auxiliary totalizer 11. All these operations are controlled automatically by means of a special control mechanism described below in such a way that for a transaction with constant overheads (series A) only two operations $a_1$, $a_2$ are necessary and for transactions with variable overheads (series B) three operations $b_1$, $b_2$, $b_3$ are carried out.

Automatic control mechanism

Figure 3:
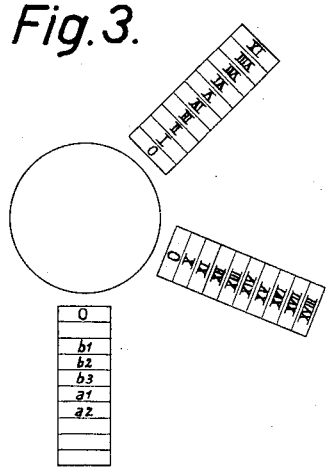
Fig. 3 shows diagrammatically the arrangement of the corresponding totalizers.
Figure 2:
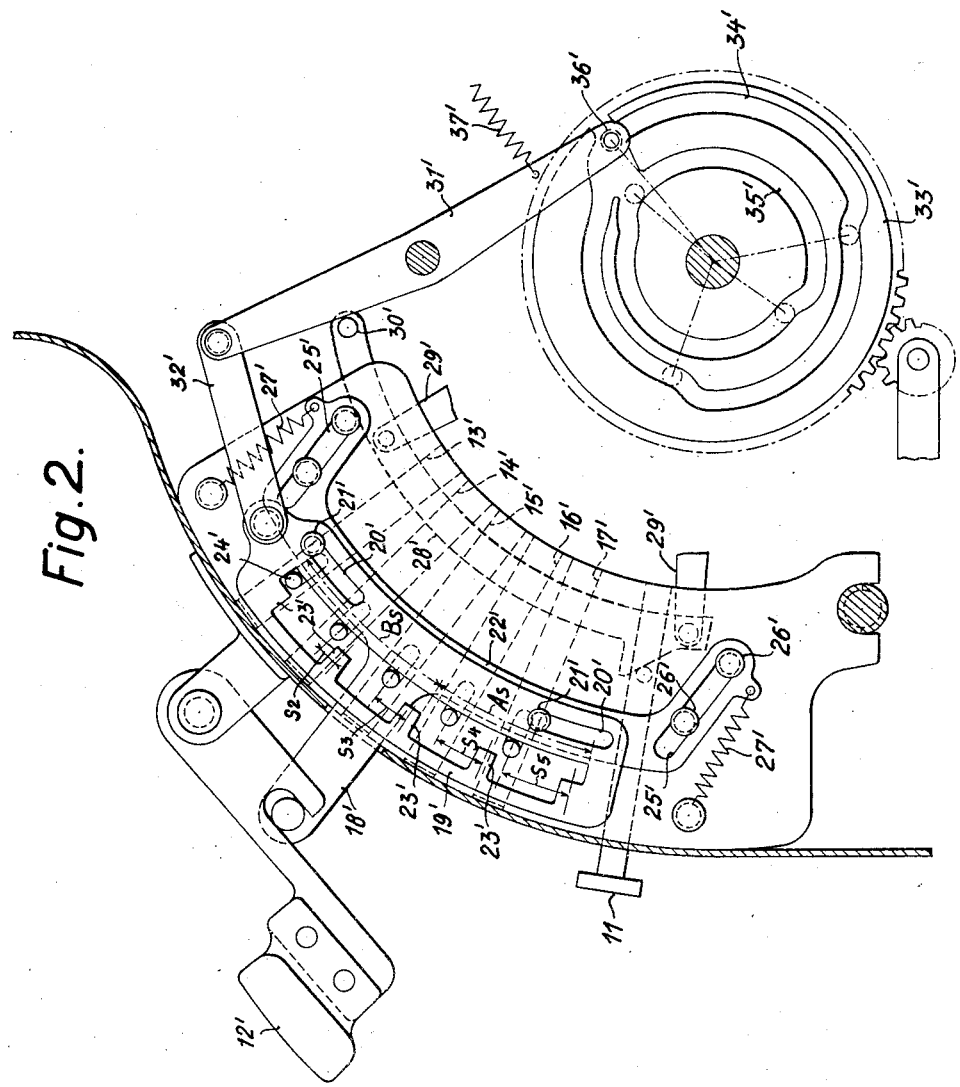
Fig. 2 shows the control member, constituted by a slide, for the machine shown in Fig. 1.

The control mechanism for the automatic sequence of associated transactions comprises in contradistinction to the arrangement shown in Figs. 1 to 3, a separate control member for each series of transactions (A or B) the drive of which is obtained from a main shaft 20 (Figs. 6, 8) which effects a full revolution in the clockwise direction at each machine operation. A pinion 21 is secured to the shaft 20 and next to it a pinion 22 of equal size is rotatably mounted on said shaft, the pinion 22 being connected so as to rotate with a toothed wheel 23 (Fig. 8) which is also rotatably mounted on the shaft 20. The rigidly mounted pinion 21 and the rotatably mounted pinion 22 are normally in mesh with a common broad coupling pinion 24, mounted on a pin 25 projecting from a slide 26. This slide 26 is guided at one of its ends on the hubs of the pinions 21 and 23, while the other end is articulated to one arm of a lever 27 pivoted to the stud 28. The other arm of the lever 27 has a forked part which engages with a stud 29 on an arm 30 connected, by a sleeve 32 mounted on a shaft 31, with an arm 33 at the further end of said tube. The arm 33 lies opposite the stud 34 on the motor key 16 when the machine is set for total taking or idle or zero amount operations and it is retained in contact with said stud by means of a spring 35 attached to the slide 26. As long as the motor key 16 is not depressed the slide 26 is in a position such that the coupling pinion 24 is in engagement with both pinions 21 and 22, so that the driving pinion 21 is coupled to both the pinions 22, 23.

When however the motor key 16 is depressed, the slide 26 is moved outwardly by means of the stud 34 and the parts 33, 32, 30, 29, 27, thereby disengaging the coupling pinion 24 from the pinions 21 and 22. During the reciprocating movement of the slide 26 a tooth 36 secured thereto is moved into the tooth gap of the pinion 22 opposite it, thus locking the pinion against rotation. The coupling pinion 24 is locked against rotation of its own accord by means of a spring pressed locking pawl 37, so that the pinion 24 will be returned to correct engagement with the pinions 21 and 22 when the motor key 16 is released.

Modified form of automatic control mechanism

Figure 14:
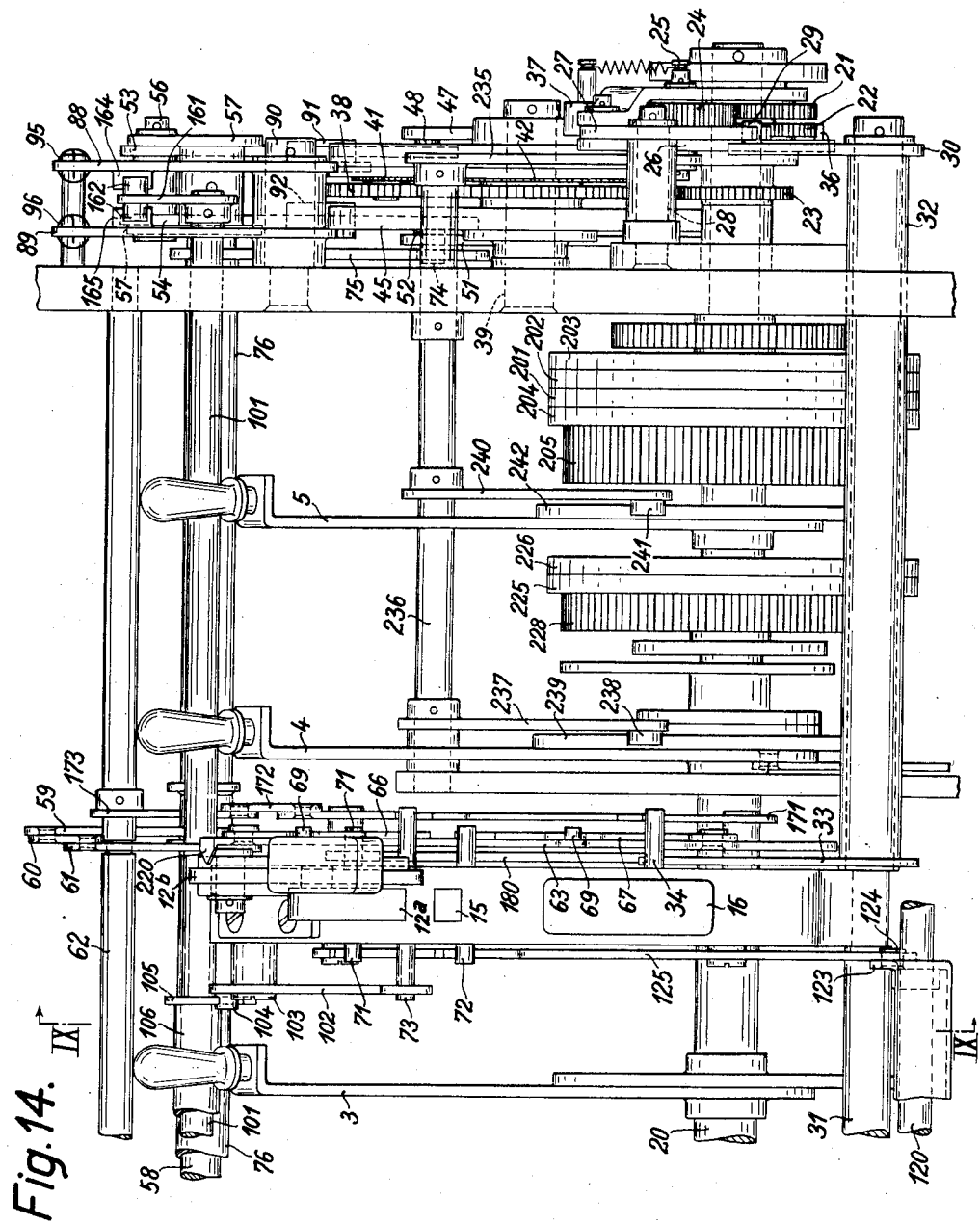
Fig. 14 is a front view of the corresponding control mechanism.

The disengagement of the pinion 24 may, instead of being produced by the motor key 16, be effected by means of the mode of operation lever 4 or 5. To this end, the bolt 25 supporting the pinion 24 is engaged by an arm 235 secured to a shaft 236, to which two further arms 237 and 240 are fixed. As shown in Figs. 9 and 14, arm 237 carries a roller 238 contacting with the periphery of a cam 239 secured to the lever 4 while the arm 240 carries a roller 241 contacting with the periphery of a cam 242 secured to the lever 5. The cams 239 and 242 are so shaped that (when both the levers 4 and 5 are in the addition position) the shaft 236 and the arms 235, 237, 240 are in the position shown in Figs. 6, 9 and 14. When however either lever is moved away from the addition position, the corresponding cam 239 or 242 produces a rocking of the shaft 236 (clockwise as seen in Fig. 6 and counterclockwise as seen in Fig. 9). The arm 235 then moves the slide 26 outwardly so that the pinion 24 is brought out of engagement with the gears 21 and 22 thus uncoupling the automatic control mechanism from the main shaft 20. In this arrangement the motor key 12 can be used to release the machine for total taking operations, so that the motor key 16 can be dispensed with.

Selective control of control members

For the selective control of the two control members which correspond respectively to the series A and B an arrangement is used in which the control members are connected to one another by means of a differential gear, the planet wheel of which takes up the movements which should be transmitted from the machine drive to the controlling member not used, but which cannot be executed by said member owing to its being locked. To this end the pinion 23 is constantly in engagement with a large gear 38 (see Fig. 7), rotatably mounted on a fixed stud 39. A pinion 41 acting as a planet wheel is rotatably mounted on a stud 40 carried by the gear 38, and this pinion meshes with the sun wheel 42 on the one hand, and with the internal teeth of the crown wheel 43 on the other hand (Figs. 6, 7 and 8). The crown wheel 43 is secured to a plate 44 rotatably mounted on the tenon 39, while the sun wheel 42 is rigidly connected to a second plate 45. Both plates are formed with cam grooves, the shape of which determines the different individual transactions of the series A, B.

When the machine is released by depressing, not the motor key 16, but the motor key 12, the driving pinion 21 remains in engagement with the pinion 22 through the coupling pinion 24, so that a whole revolution is given to the pinion 23. In view of the gear reduction between the pinions 23 and 38, the pinion 38 receives ⅕ of a revolution (72°) in the counterclockwise direction only. By means of a device, to be described below, one or other of the cams 44 or 45 is always held fixed, so that the planet wheel 41 runs either on the crown wheel 43 or on the sun wheel 42, thus giving a counterclockwise rotation to the cam 45 or 44 which happens to be free at the time. The gear ration between the members 41, 42, 43 is made such that for a rotation of the planet wheel 41 of a ⅕ of a revolution (72°) in the counterclockwise direction, the planet wheel causes (the cam 44 being fixed) rotation of the cam 45 through 180° in the counterclockwise direction or (the cam 45 being fixed) rotation of the cam 44 through 120° in the counterclockwise direction.

Figure 16:
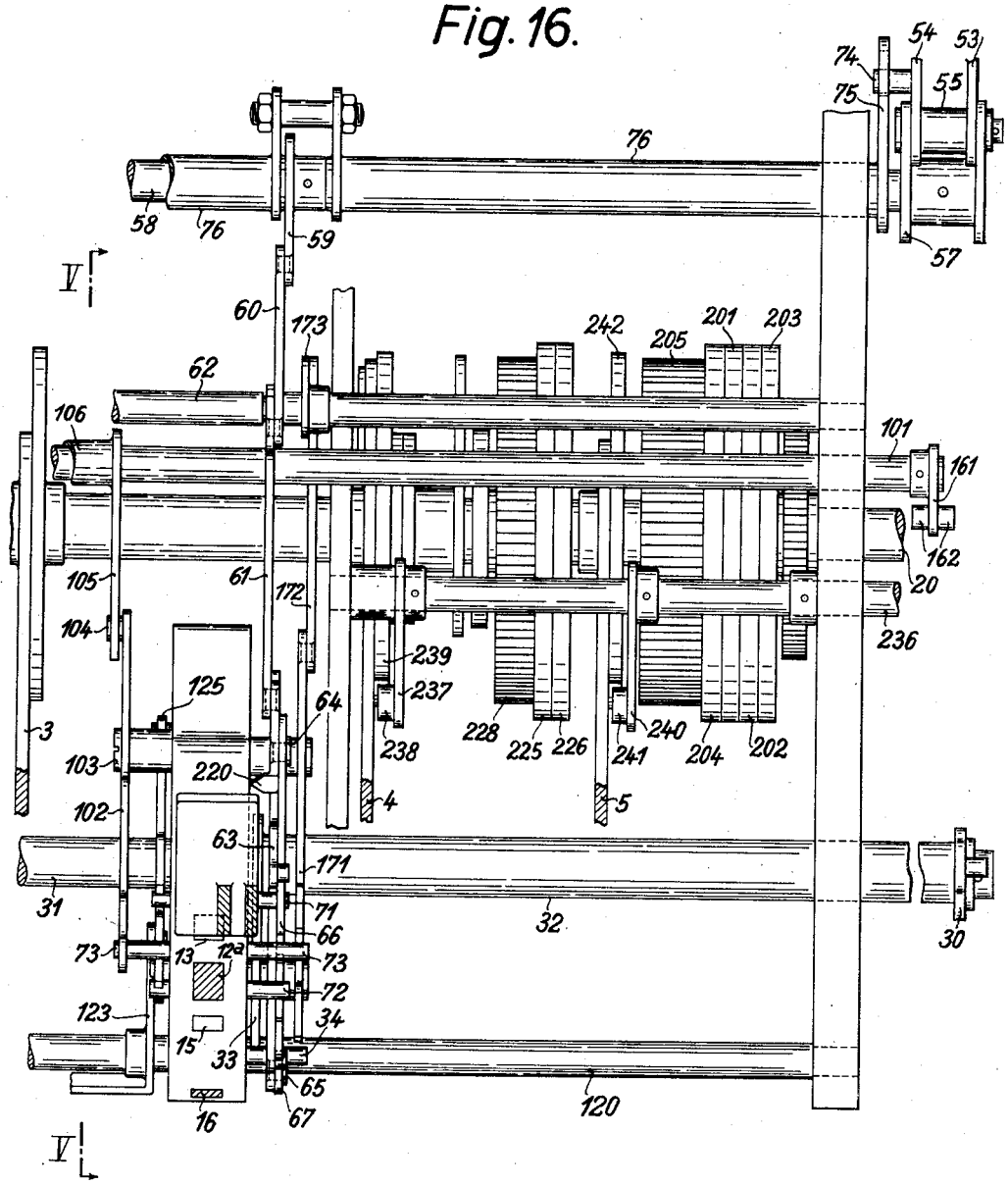
Fig. 16 is a plan view of the corresponding control mechanism.

In the groove 44a of the cam 44 engages a roller 46 on the lever 47 (Figs. 6 to 8) which is rotatably mounted on a stud 49 and carries a stud 48. On the stud 49 is mounted a second lever 51 having a stud 52 at one end and a roller 50 at the other end; this roller engaging in the groove 45a of the cam 45. Both levers 47 and 51 have the same shape and lie one behind the other in the rest position shown in Fig. 6, so that the studs 48 and 52 lie in the same line. In the plane of the stud 48 is a lever 53 and in the plane of the stud 52 a lever 54. These levers are formed at their lower ends with forks 53a and 54a and are rigidly mounted on a common hub 55 rotatably mounted on a stud 56. The arms 53 and 54 are displaced relatively to one another in such a manner that the double lever 53, 54 pivoted at 56 engages, when in its normal left hand end position by means of the fork 53a with the stud 48, and when in its right hand end position by means of the fork 54a with the stud 52. The stud 56 is carried by two arms 57 secured to a shaft 58 which carries an arm 59 (Figs. 6, 14 and 16). The arm 59 is connected by a link 60 to a slide 61 which is guided on a shaft 62 and articulated to a coupling slide 63 movably mounted on the motor key bank. Coupling pawls 66, 67 are mounted respectively on studs 64 and 65 on the coupling slide and each of these pawls is pressed against a stud 69 by a spring 68. The ends of these pawls are formed with forks to cooperate respectively with the studs 71, 72 of the blind keys 13 and 15; and the lower longer forked arm of each of said pawls is constantly in contact with its associated stud. The slide 63 and the pawls 66 and 67 may be displaced by means of the grooves 44a and 45a of the cams 44 and 45 (in the manner to be described below) so as either to engage the stud 71 with the fork of the pawl 66 (as shown in Fig. 6) or, in the other extreme position of the slide to engage the stud 72 with the fork of the pawl 67, while in the middle position of the slide neither of the studs is engaged by its corresponding pawl. The pawl 66 or 67 which is in engagement with the corresponding idle key contacts by means of its prolonged lower end with the under surface of the stud 73 of a key stem 12a, which is connected with a lever 12b supporting the head of the motor key 12, so that depressing the motor key 12 will cause the depression of the blind key 13 or 15 which has been coupled. When the slide 63 is in its middle position, the stud 73 of the motor bar lies between the prolonged lower ends of the pawls 66, 67, so that on depressing the motor key neither of the blinds keys 13 and 15 is depressed with it.

A pointer 220 (Figs. 4, 6 and 14), mounted on the slide 63, projects outside the cabinet and indicates the position of the slide 63 on the scale 221 in front of the machine, which is inscribed "time", "salary", or "overheads", as shown in Fig. 4. In the rest position of the machine, the pointer 220 is positioned on "time" and is moved to "salary" at the end of the first transaction. Assuming that the series of transactions to be recorded is a calculation of salary with constant overheads (A), composed of only the "time", and "salary" operations, the pointer 220 is returned to its initial position "time" at the end of the second machine operation. If the series of transactions is a calculation of salary with variable overheads (B), necessitating three machine operations, the pointer is moved to "overheads" at the end of the second operation and is not returned to its initial position "time" until the end of the third operation. The pointer therefore indicates at any time the nature of the next operation to be effected.

Figure 12:
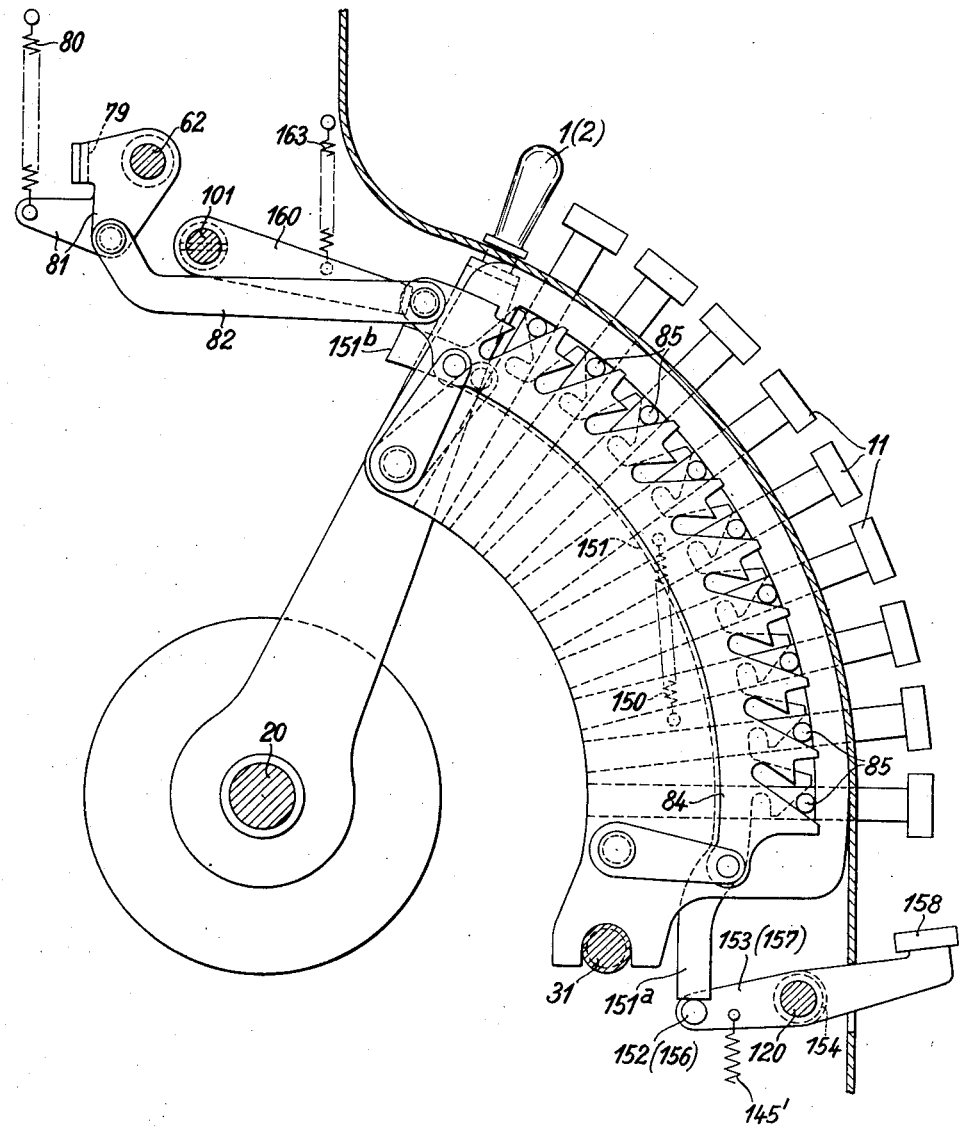
Fig. 12 is a section through the auxiliary totalizer bank taken along the line XII—XII in Figs. 13 and 15.
Figure 13:
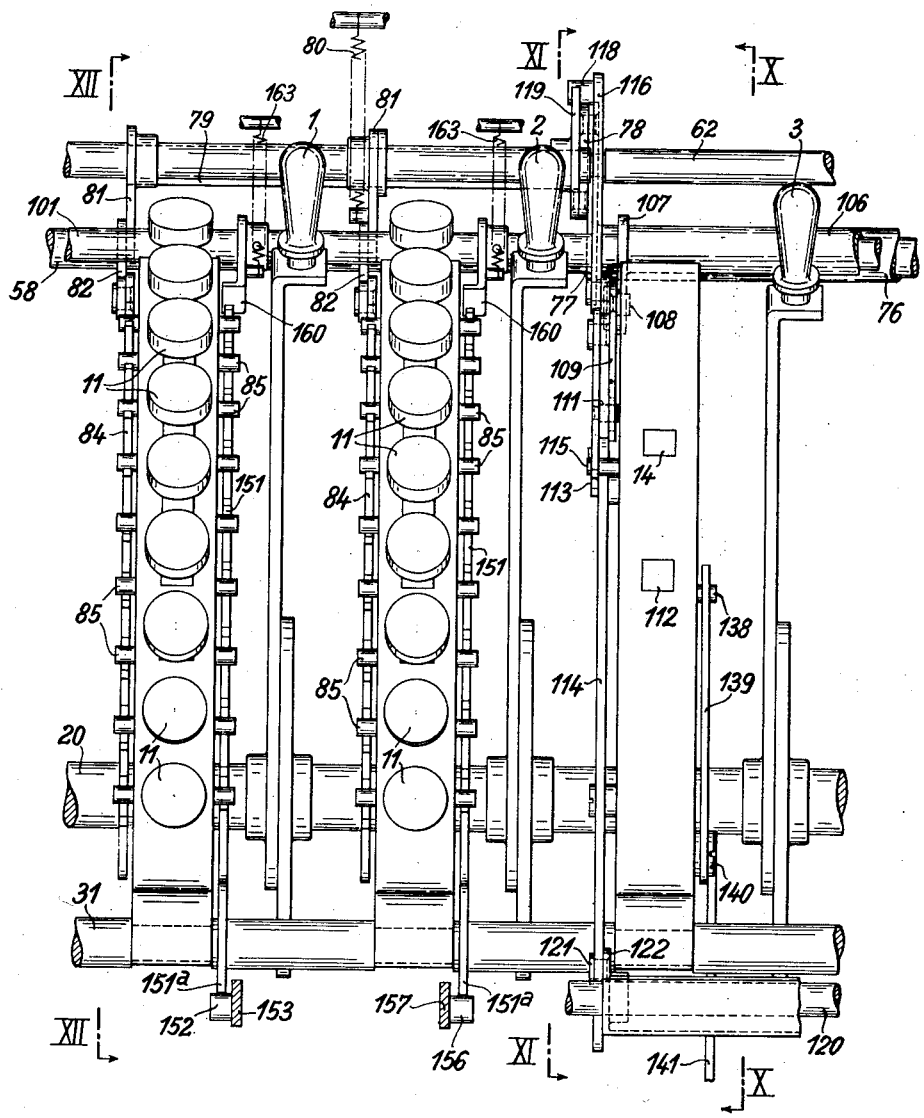
Fig. 13 is a front view of the key banks, the cabinet being removed.
Figure 15:
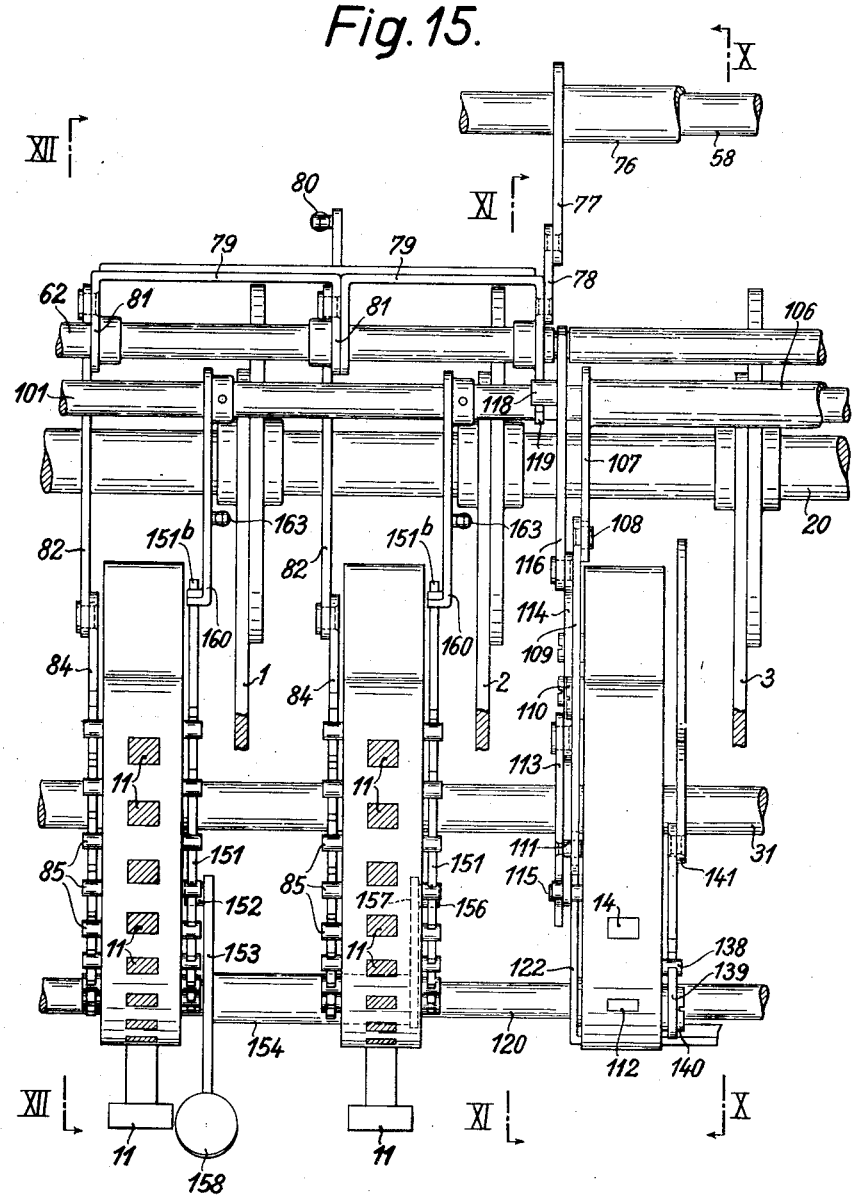
Fig. 15 is a plan view of the key banks.

A stud 74 is mounted on one arm 54 of double lever 53, 54, said stud cooperating with a slot in a lever 75 (Fig. 6), which is secured to a lever 77 by means of a sleeve 76 rotatably mounted on the shaft 58. The lever 77 is connected by means of a link 78 to a yoke 79 mounted on the shaft 62 (Figs. 6, 11 and 15). A spring 80 attached to an arm 81 of the yoke 79 tends to turn the latter in the counterclockwise direction (as seen in Fig. 6) thus maintaining the double lever 53, 54 in its left hand end position in which the stud 48 is in the fork slot 53a, by means of the arm 78, the lever 77, the sleeve 76 and the lever 75. Therefore, the lever 47, which is in connection with the cam 44, is maintained in connection with the coupling slide 63 of the motor key bank. The yoke 79 is provided with two arms 81 (Figs. 12, 13 and 15). A link 82, coupled to each of these arms, is articulated to a key slide 84. One of the key slides is pivotally mounted on one key bank of the control keys 11 for the auxiliary totalizers and the other key slide is pivotally mounted on the other key bank for the auxiliary totalizers. Both slides cooperate by means of their bevelled surfaces with the key studs 85 of the keys 11 and in such a way that depressing one of these keys causes the associated slide 84 to be moved downwardly. This causes the link 82 to rock the yoke 79 in the counterclockwise direction (Fig. 12), thus causing, by means of the link 78, lever 77 and sleeve 76, a counterclockwise rotation (Fig. 6) of the lever 75. The latter, by means of the stud 74, rocks the double lever 53, 54 thus freeing the stud 48 from the fork slot 53a and engaging the stud 52 with the fork slot 54a. The cam 45, which is in connection with the lever 51, is then coupled with the double lever 53, 54. When the control keys 11 are released the yoke 79 rocks back into its initial position under the action of the spring 80, and this also returns the double lever 53, 54 to its initial position in which the fork slot 53a is in engagement with the stud 48 of the lever 47 connected with the cam 44.

The lever 75 (Fig. 6) which, as explained above, rocks in the counterclockwise direction upon depressing a control key 11 is provided with a projection 87 (Figs. 6 to 8) cooperating with two arms 88, 89, both rotatably mounted on a shaft 90. The arms 88, 89 carry rollers 91, 92, respectively. In the rest position of the machine each roller lies opposite a recess in one of the cams 44 and 45; the roller 91 facing the recess 93 in the cam 44, and the roller 92 facing the recess 94 in the cam 45. Springs 95, 96 are attached respectively to cranked extensions of the arms 88, 89 and these springs tend to maintain the rollers 91, 92 in their corresponding recesses, thus maintaining the cams 44, 45 in their rest position.

The projection 87 is so disposed that, when the lever 75 is in its left hand position, it lies opposite the end of the lever 89, thus being out of the path of the lever 88. If, on the contrary the lever 75 is in its right hand position, the projection 87 lies in the path of a projection 88a on the lever 88, while the path of the lever 89 is unobstructed. If no control key 11 is depressed, the cam 45 is held fast and the coupling slide 63 is connected with the cam 44; but if one of the control keys 11 is depressed, the cam 44 is held fast and the coupling slide 63 is connected to the cam 45. The grooves 44a and 45a are so shaped that one or other of them, according as whether the slide 63 is connected with the cam 44 or the cam 45, positions the slide 63 in such a way that, in the rest position of the machine, the blind key 13 is coupled with the motor key 12.

If no control key 11 is depressed and the cam 45 is accordingly held fast, the cam 44 will receive, as stated above, a rotation of 120°. Now the groove 44a is so shaped that the lever 47 displaces the slide 63 and the pawls 66, 67 (by means of the parts 53 and 56 to 61) in such a manner that at the end of the first operation ($b_1$) (after rotation through 120° of the cam 44) the key stems 13 and 15 are both disengaged from the motor key 12 for the second machine operation ($b_2$), so that the totalizer row is maintained in the zero position (position 97 in Fig. 4), thus causing the engagement of the grand totalizer for salaries of both series ($b_2$ $b_2$). At the end of this operation (after a rotation of 240° of the cam 44), the key stem 15 is coupled with the motor key 12 for the third machine operation ($b_3$) and at the end of the third operation (after 360° rotation of the cam 44) the blind key 13 is again coupled with the motor key 12. If, on the contrary one of the control keys 11 is depressed, thus locking the cam 44, the cam 45 turns through 180° at each operation. The groove 45a is so shaped that the lever 51 displaces the slide 63 in such a way that at the end of the first operation ($a_1$) (after a rotation through 180° of the cam 45), the key stem 15 for the second operation ($a_2$) is out of engagement with the motor key, and at the end of this operation (after a rotation through 360° of the cam 45), the key stem 13 is again coupled with the motor key. Therefore the key stem 13 is always depressed with the motor key during the first machine operation, whilst no key stem is depressed during the second operation. If however, owing to none of the control keys 11 being depressed, a series of three transactions $b_1$—$b_3$ is introduced, the key stem 15 is automatically coupled during the third machine operation.

Figure 5:
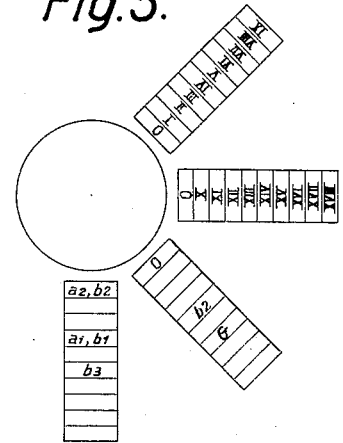
Fig. 5 shows the corresponding arrangement of totalizers.

The depressed key stem 13 or 15 constitutes a stop for the differential mechanism (not shown) which selects the corresponding totalizer $a_1$ $b_1$ or $b_3$. If neither of the keys 13 or 15 is depressed, the differential mechanism is retained in the stationary position (Fig. 9) by the zero stop lever 97, thus selecting the grand totalizer for salaries $a_2$ $b_2$ (Fig. 5).

The stud 73 on the stem 12a of the motor key 12 is in engagement with a lever 102 (Fig. 9) pivoted on a stud 103, and carrying at its other end a stud 104, which engages an arm 105 secured to a sleeve 106 mounted on a shaft 101 (Figs. 9, 14 and 16). An arm 107 secured at the other end of the sleeve 106 engages by means of its forked end with a stud 108 carried on a lever 109 (Figs. 10 and 11) pivoted to the stud 110 and engaging at its other end with a stud 111 on a pawl 113 pivoted to the slide 114 belonging to the third differential mechanism, which corresponds to the totalizer for mechanical salaries ($b_2$). The pawl 113 engages with its forked end a stud 115 on the key stem 14 of this totalizer and brings the stem 14 into the depressed position when no key 11 is depressed. In this condition, it is possible to depress the key stem 14 with the motor key 12. Pivoted to the slide 114 is a link 116, which is guided on the shaft 62, and maintained with its roller 118 against the lever 119 under the action of a spring 17. The lever 119 is rigidly connected with the yoke 79. The slide 114 is normally so positioned that the forked end of the coupling pawl 113 engages the stud 115 on the key stem 14, so that the latter is depressed with the motor key 12. If one of the control keys is depressed the yoke 79 will be rocked counterclockwise as described above, and carry with it the arm 119, so that the slide 114 will be displaced by a distance sufficient to disengage the coupling pawl 113 from the stud 115, so that depressing the motor key 12 will produce an idle movement of the coupling pawl 113, the totalizer $b_2$ being left disengaged.

A stud 121 on an arm 122 engages a slot in the slide 114 (Fig. 11); this arm being mounted on a shaft 120 and connected by a yoke to a second arm 123 which engages, by means of its stud 124, with the key slide 125 of the motor key bank (Fig. 9). The slide 125 is formed with two inclined surfaces cooperating with the studs 71, 72 on the key stems 13 and 15 corresponding to the grand totalizer for time ($a_1$ $b_1$) and to the overheads totalizer ($b_3$). On depressing one of these two keys the slide 125 moves the slide 114 upwards by means of the yoke 122, 123, the totalizer for mechanical salaries ($b_2$) remaining disengaged.

In certain conditions it is necessary to have a grand totalizer for the salaries and overheads entered in both series, and this grand totalizer is preferably arranged in the row of the totalizer $b_2$ and is selected by a key stem 112 of the differential bank corresponding to the key stem 14, when the total is to be taken from the totalizers allotted to the lever 4. To this end, the key stem 112 is connected by its stud 138 with a bell crank lever 139 mounted on a stud 140 (Fig. 10) and is connected by a link 141 with a yoke 142 mounted on a shaft 143. A slide 144 (Fig. 9) is articulated to the yoke 142, said slide 144 being guided on a shaft 145 and carying a roller 146, which cooperates with a groove 147a in the segment 147. This segment 147 is connected by a link 148 to the lever 4 mounted on the shaft 20. The lever 4 is used to determine the mode of operation for the three totalizers $a_1$ $b_1$, $a_2$ $b_2$ and $b_3$ disposed in the fourth totalizer row. When the lever 4 is in its initial position, the control device 225—232 for the mode of operation is so positioned that the totalizers in this row are coupled for addition. If however the lever 4 is removed from its initial position and brought into one of the positions "salary", "time", or "overheads", the corresponding totalizer is selected and coupled for a total taking operation. When the lever 4 is moved to its different positions of adjustment, the segment 147 is turned accordingly. The groove 147a is so shaped that so long as the lever 4 is on "addition" or "total time", the slide 144 remains in its initial position (Fig. 9), but when the lever 4 is moved to "total salary" or "overheads", the slide 144 is moved downwards by a definite amount. This movement causes the yoke 142 and the crank lever 139 to rock in clockwise direction (Fig. 10), thus actuating the blind key 112 so as to select the corresponding totalizer G which, with the form illustrated for the segment 147, accumulates the totals of the totalizers $a_2$ $b_2$ and $b_3$.

To release the depressed control keys 11 at the end of the series A of transactions produced by them, a locking slide 151 (Figs. 12, 13 and 15) is provided, said slide having a projection 151a cooperating with pins 152, 156 mounted respectively on arms 153, 157 secured to the shaft 120, the arms 153, 157 being connected by a sleeve 154. In the plane of the controlling cam 45 (Fig. 6) which controls the series of transactions (A) for manual items of work an arm 140¹ is secured to the shaft 120 and a stud 141¹ on said arm is connected by a link 142¹ with the lever 143¹, the stud 144¹ of which contacts under the action of a spring (145¹ in Fig. 12) with the periphery of the controlling cam 45. Just before the end of the operation $a_2$ (that is when the lever 89 enters its initial position) the stud 144¹ cooperates with a projection 146¹ of the cam 45, which receives a counterclockwise movement from the shaft (Fig. 6) and, through action of the pins 152, 156 (Fig. 12), moves the slides 151 upwardly, thus releasing the depressed control key 11. By means of a lever (not shown) the connection between the parts 144¹ and 145¹ may be interrupted, in order to avoid having to depress the same key (e. g. I), after every second machine operation when registering items of work belonging to one and the same calling (I). The depressed special key 11 is locked until the end of the second machine operation in the following manner. An arm 160 is situated in the plane of each of the upper projections 151b of the locking slide 151, and these arms 160 are secured to the shaft 101. To the right hand end of the shaft 101 is secured an arm 161 (Figs. 6, 14, 16) carrying on both of its sides a stud 162. Under the action of a spring 163 attached to the arm 160, the studs 162 contact against the bent parts 164 and 165 of the bell crank levers 88 and 89. So long as the rollers 91 and 92 of the crank levers 88 and 89 remain, in the stationary position of the machine, in the recesses of the cams 44 and 45, the spring 163 maintains the arms 160 out of the path of the locking slides 151 so that a control key 11 may be depressed. If, at the end of the first operation either the lever 88 is rocked by the cam 44 or the lever 89 by the cam 45 in the counterclockwise direction, the arm 161 (Fig. 6) is rocked downwards by means of the corresponding bent part 164 or 165, so that the arms 160 are located in front of the projections 151b, thus locking the slides 151 and therefore all the keys 11. If one of the keys 11 is depressed, the locking effect in question is maintained in force during the two machine operations belonging to this series, since the cam 45, which is operative in this case, does not bring its recess 94 opposite the roller 92 until the end of the second operation. If, on the contrary, a transaction is recorded without the use of a control key, all the keys 11 remain locked during the three operations belonging to that series, owing to the fact that the cam 44, which is operative in this case, does not bring its recess 93 opposite the roller 91 to enable the spring 163 to return the arms 160 to their inoperative positions until the end of the third operation. During all the other machine operations the depressed special key 11 is not released as no further automatic releasing mechanism is provided for the key detents 151. One of the two arms 153, 157 supported on the shaft 120 is provided with a head 158 (releasing key) in order to release the keys 11 manually, especially during other operations of the machine (for instance in the case of a total taking operation from the auxiliary totalizers a key must be depressed). This manual release (for instance by means of the key 158) of the auxiliary totalizer keys 11 is impossible during the operations of series A determined by the depressed keys locking the surfaces 44, 45.

The motor key 12, which releases the machine for all addition operations, is normally locked owing to a projection 170 on a slide 171 lying under the stud 73 on the key stem 12a (Fig. 6). The slide 171, which is slidably mounted in the motor key bank, is connected by a link 172 to an arm 173 secured to the shaft 62. This shaft 62 is elastically coupled to the amount key banks in known manner (not shown), in such a way that the depression of an amount key causes the shaft 62 to be rocked in the clockwise direction. The slide 171 is thus moved downwards, through the arm 173 and the link 172, so that the projection 170 is removed from the path of the stud 73, while a second projection 174 on the slide 171 is brought under the stud 34 of the motor key 16. Consequently the motor key 12 is free for all amount-entering operations, while the motor key 16 is free for all total taking or idle operations.

For the entering of times $a_1 b_1$ of both series A, B, only the fourth row of totalizers which includes the grand totalizer for time $a_1 b_1$ is permitted to engage the differential actuators. It is therefore desirable to provide a common mechanism for disabling the remaining rows of totalizers (especially the two rows of auxiliary totalizers I to XVIII), the action of which is controlled from the key stem 13 of the grand totalizer for time $a_1 b_1$.

The stud 71 on the blind key stem 13 is engaged by the forked end of a link 180 (Figs. 17 and 18), the other end of which is connected to a cam 181 rotatably mounted on the shaft 20. A spring 182 tends to turn the cam 181 in the counter-clockwise direction, thus resiliently coupling the cam 181 with the blind key 13. Under the action of the spring 184, a roller 185, carried by the lever 186 rotatably mounted on a shaft 183 contacts with the surface 181a of the cam. The forked end of another lever 187, rigidly connected to the lever 186, engages a stud 188 carried by a bell crank lever 189 rotatably mounted on the shaft 191. The lever 189 is rigidly connected to a second lever 190 carrying a bolt 192 on which is mounted a wide pinion 193. The surface 181a is so shaped that, so long as the blind key 13 is not depressed, the coupling pinion 193 is in mesh with two juxtaposed gear wheels 194 and 195 of equal size which are journalled on a shaft 196. The gear wheel 194 is rigidly connected by a sleeve 197 with a pinion 198, which is actuated at a different time, according to the position of the lever 5. The gear wheel 195 is connected by a sleeve 206 with a pinion 207 meshing with a gear wheel 208, the movement of which is further transmitted for coupling the three rows of totalizers referred to above.

So long as the key stem 13 is not depressed, the gear wheels 194, 195 are coupled together by means of the pinion 193, as stated above, so that the driving movement of the pinion 198 (caused by the mode of operation cam 201—204 which is operative) is transmitted to the gear wheel 208 by the parts 197, 194, 193, 195, 206, 207, whereby said totalizer rows are coupled at times corresponding to the mode of operation selected.

If, on the contrary, the key stem 13 is depressed with the motor key 12, the cam 181 is turned clockwise, whereby, owing to the shape of the surface 181a, the pinion 193 is disengaged by the parts 185—190, from the gear wheels 194 and 195. The connection between the pinion 198 and the pinion 207 is thus interrupted, so that the engagement of the above mentioned three rows of totalizers is not effected. On the bolt 192 is mounted a slide 212 which is guided on the shaft 196, and which carries a locking tooth 213 which is brought into engagement with one of the gaps between the teeth of the pinion 195, thus locking said pinion against rotation, when the coupling pinion 193 is rocked out of its operative position. Furthermore, the coupling pinion 193 is locked in its disengaged position by means of a spring loaded pawl 215. A hooked lever 218 is mounted on the shaft 196, said lever being connected by a link 219 with the cam 181. In the normal position, the hook 218a on the lever 218 engages with the bolt 192 so that the coupling pinion 193 is maintained positively in mesh with the gear wheels 194 and 195. Upon depressing the key stem 13, the cam 181 is turned and the lever 218 is at once rocked so that the hook 218a releases the bolt 192, thus permitting the pinion 193 to be rotated out of its operative position.

The following description of the working of the machine refers to the embodiment illustrated in Figs. 4 to 18. The embodiment shown in Figs. 1 to 3 works in a similar manner, so that no specific description of its operation is given.

*Mechanical work transactions (Series B)*

It is assumed that first of all all items of mechanical work together with a variable supplement for overheads are to be separately recorded. All levers 1 to 5 therefore remain in their addition position and the time in minutes needed for the work in question is first set by the amount keys 10. Depressing these keys causes (in known manner, not shown) the shaft 62 (Figs. 6, 13) to turn the clockwise direction, and thereby, through the action of the parts 173, 172, to move the locking slide 171 of the motor key bank downwards to an extent such that the locking projection 170 releases the addition motor key 12 and the locking projection 174 locks the idle and total taking motor key 16. Without any further setting the motor key 12 can be depressed, whereby the key stem 13 (coupled thereto in the rest position of the machine by means of the pawl 66) is also depressed. The stud 71 on the key stem 13 produces an upward movement of the slide 125 (Fig. 9), whereby, through the parts 124, 123, 122, 121 (Fig. 11), the slide 114 is moved upwardly together with the coupling pawl 113, thus disengaging the latter from the key stem 14. The key stem 14 is normally connected with the motor key 12 by the parts 115, 109—102, 73 (Figs. 9, 10), so that the key stem 14 is partly depressed with the key 12, but after the disengagement of pawl 113 from key 14, the latter is restored by a spring in a manner well known in the art. Owing however to the disengagement of the pawl 113 from the pin 115, the key stem 13 only remains depressed with the motor key 12 (carrying with it, in manner not shown, the zero stop lever 97, Fig. 9), so that the key stem 13 constitutes, in the next following machine operation $b_1$, the stop for the totalizer selecting members (not shown) which select the corresponding totalizer $a_1 b_1$ to accumulate the total working times. In the key bank containing the stem 14, on the contrary, the zero stop lever will not be actuated owing to the disengagement of the coupling pawl 113 so that in this bank no totalizer will be selected. During the first operation therefore, the time, which has been set on the amount keys is accumulated in the selected totalizer $a_1 b_1$.

The parts of the controlling device are, at the beginning of the first operation, in the initial position, shown in Fig. 6, in which the projection 87 on the lever 75 is in the path of the bell crank lever 89. The cam 45 is therefore locked by the roller 92 and the cam 44 is only resiliently held by the roller 91 on the spring loaded bell crank lever 88. A single rotation of the main shaft 20 turns the cam 44 through 120° in the counterclockwise direction, as described above. The bell crank lever 88 is therefore rocked in the counterclockwise direction whereby the bent part 164 carries with it the lever 161 and places the locking arms 160 (Figs. 6 and 12) in front of the locking slides 151 for the banks of control keys, thus locking the latter until the cam 44 has made a complete revolution, that is the locking effect is kept up during all three operations of the series.

At the end of this first operation, the slide 63 is moved upwardly by means of the groove 44a, and the parts 46, 47, 48, 53, 56, 57, 58, 59, 60, 61 (Fig. 6) by an amount such that the coupling pawl 66 disengages the key stem 13 from the motor key 12. Owing to the movement of the slide 63, the index 220 connected thereto is displaced from "time" to "salary", thus showing that in the next operation the salaries are to be recorded.

On the release of the key stem 13, the slide 125 is returned by means of the spring 126 to its normal lowered position shown in Fig. 9, carrying with it the slide 114 (Fig. 1) due to the movement of the yoke 123, 122, so that the pawl 113 once more engages the pin 115 on the key stem 14.

For the second operation $b_2$ of the series B, the salary is set by means of the amount keys 10, and the motor key 12 is depressed, the key stem 14 (Fig. 11) being depressed therewith owing to the movement of the shaft 101 (see Fig. 9), and the key 14 selects the totalizer $b_2$ for accumulating the mechanical salaries. Owing to the fact that neither of the key stems 13, 15 is depressed in the motor key bank, the zero stop lever 97 is not moved, so that the grand totalizer for salaries $a_2 b_2$ which occupies the zero position in that row, is selected. The amount of salary is thus accumulated in each of the totalizers $b_2$ and $a_2 b_2$ during the second machine operation $b_2$. At the end of this operation, the groove 44a moves the slide 63 upwardly by an amount sufficient to couple the blind key 15 with the motor key 12 by means of the pawl 67; the index 220 being merely moved to the position "overheads".

To record the "overheads" the amount thereof is set on the amount keys 10 and the motor key 12 depressed, so that the key stem 15 which selects the overheads totalizer $b_3$, is depressed. The slide 125 and, through the yoke 123, 122, the slide 114 are thereby moved upwardly to an extent sufficient to disengage the pawl 113 from the key 14.

At the end of the third operation $b_3$, the key stem 14 is once more engaged with pawl 113 when the key stem 15 is released. The grooved cam 44 which, at the end of the third operation has effected a whole revolution, causes by the shape of its groove 44a, the slide 63 of the motor key bank to be returned to its initial position (Fig. 6), in which the pawl 66 connects the blind key 13 with the motor key 12, and returns the index 220 to the "time" position. The roller 91 of the crank lever 88 can then fall into the recess 93 and the spring 163 (Fig. 12) can therefore rock the arm 160 secured to the shaft 131 out of the path of the locking slide 151, so that the control keys 11 are released again. The recording of the mechanical work transactions with variable overheads is thus terminated, and all data concerning the mechanical work transactions are registered in the same way, only the time, the salary and the cost being set by means of the amount keys, and the machine being released by depressing the motor key 12.

After all the salaries for mechanical items of work have been calculated, the lever 4 is positioned on "total salary", ($a_2 b_2$) whereby the key stem 112 is depressed through the parts 149, 147, 146, 144, 142, 141 and 139 (Figs. 9 and 10). The key stem 112 selects the grand totalizer G in the third row for the accumulation of all amounts entered. Since in this case no amount key has been depressed, the motor key 12 is locked, so that only the total taking motor key 16 can be depressed. On depressing the motor key 16, the coupling pinion 24 is disengaged by means of the parts 33, 26, and consequently the cams 44 and 45 are uncoupled from the main drive (20) so that the automatic control is suppressed, when the lever 4 is set to position "$a_2 b_2$", the $a_2 b_2$ totalizer is selected. The totalizer $a_2 b_2$ selected by the lever 4 is, in consequence of the mode of operation determined by said lever 4, zeroized during the first part of this machine operation and the total hereby taken from it (total of all salaries for mechanical items of work) is transferred, during the second part of the operation, to the grand totalizer G selected by the key stem 112.

Manual work transactions
(Series A)

For the calculation of manual items of work, two operations $a_1$ and $a_2$ only are required for recording the necessary time and the amount of salary calculated therefrom, since the possible overheads may be added to the total. The amounts of salaries for manual items of work are divided into groups of callings (locksmith, smith, painter, etc.), and to this end it is necessary first to depress the auxiliary totalizer key 11 (for instance I) corresponding to the calling required (for instance locksmith), which key selects the corresponding totalizer. By depressing the key 11, the yoke 79 and the arm 119 (Fig. 11) are rocked by means of the slide 84, in the counterclockwise direction as seen in Fig. 12, so that the slide 114 is moved upwards thus disengaging the pawl 113 from the key stem 14. Furthermore the rocking movement of the yoke 79 is communicated by the parts 78, 77, 76, 75, 74, to the double lever 53, 54 (Fig. 6), which is rocked to the right to an extent such that the slot 53a releases the stud 48 and that the slot 54a engages the stud 52. The coupling slide 53 mounted on the motor key bank is thus connected with the cam 45, while the cam 44 is locked since the projection 87 of the rocked arm 75 lies in front of the projection 88a on the bell crank lever 88.

Figure 17:
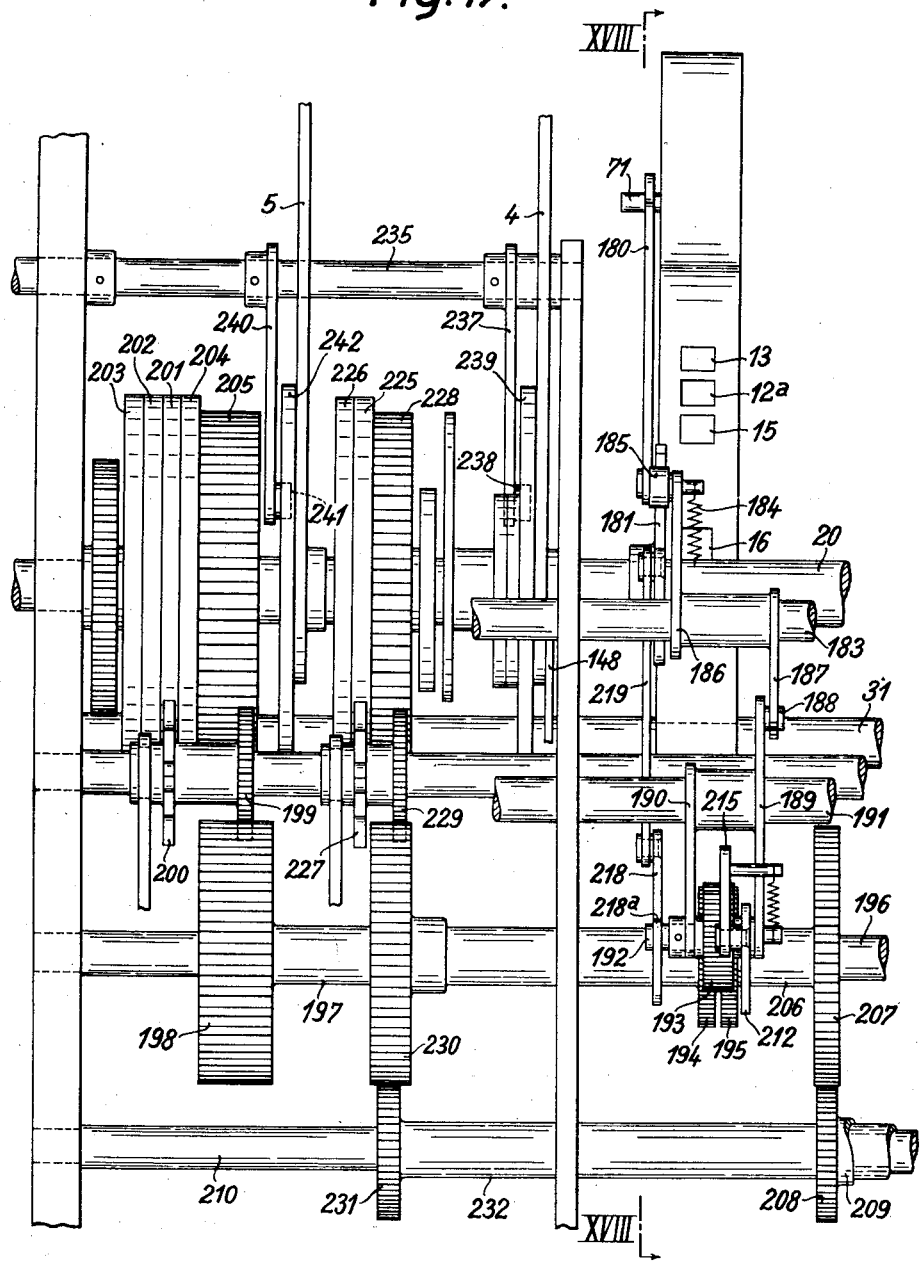
Fig. 17 is a rear view of the control mechanism.
Figure 18:
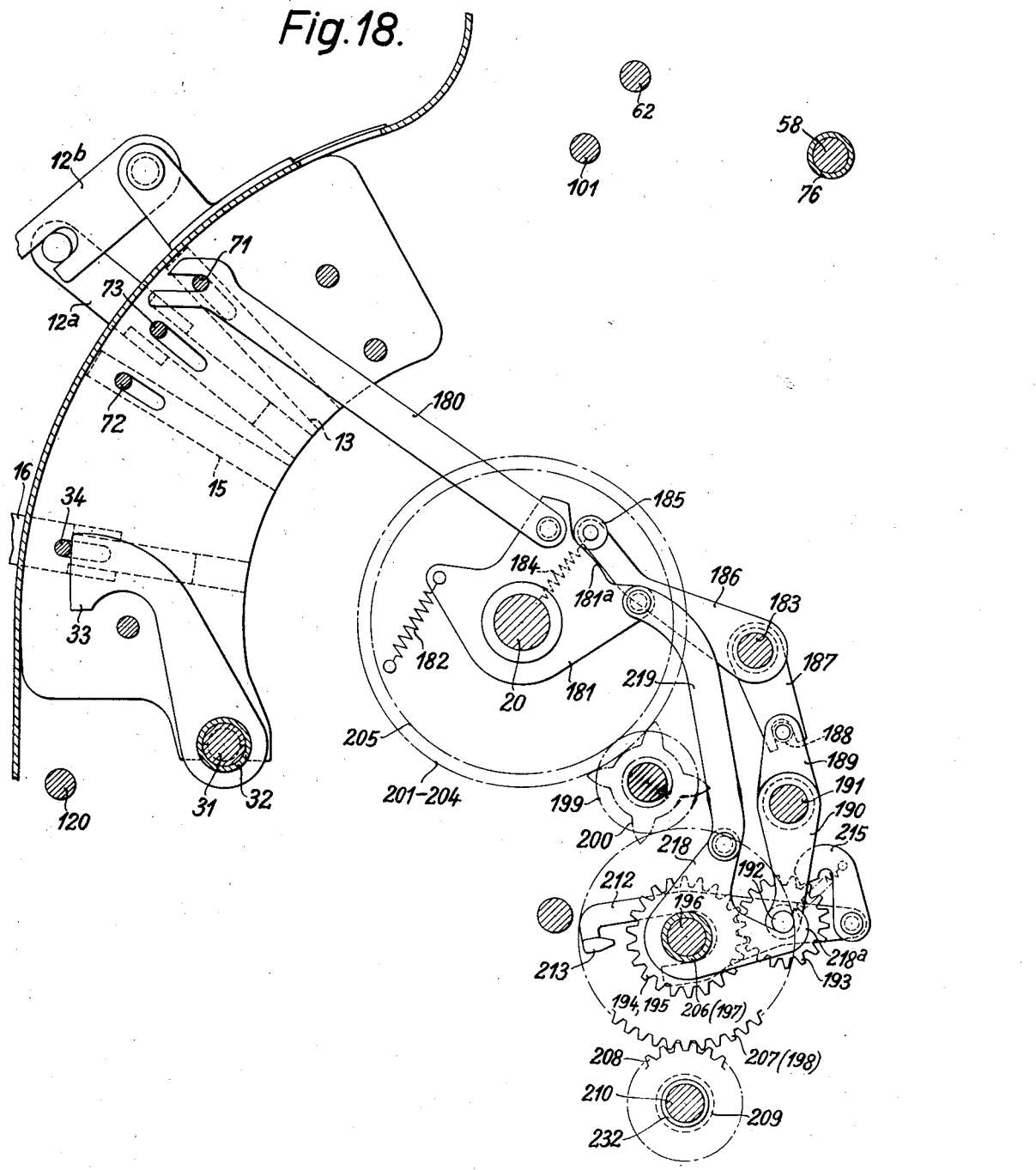
Fig. 18 is a section taken along the line XVIII—XVIII in Fig. 17.

For the recording of the necessary time the amount keys are set and thus the motor key 12 is freed and the motor key 16 locked by means of the slide 171 (Fig. 6). Depressing the motor key 12 also depresses the key stem 13 which selects the totalizer $a_1 b_1$ and causes the cam 181 to be turned in the clockwise direction by the link 180 (Figs. 17 and 18). The movement so given to the link 219 rocks the hook 218a and the coupling pinion 193 is also rocked by means of the parts 185—190, so that the connection 194, 195 between the mode of operation cams 201—205 and the throw in device 207—208 for the auxiliary totalizers and for the third row of totalizers $b_2$ and G is interrupted. The engagement of the nose 213 with the gear 195 locks the part of the coupling device for the totalizers which has become disengaged. At the beginning of this operation, the rotation of the cam 45 causes the bell crank lever 89 to be turned counterclockwise and the arm 161 and shaft 101 are consequently rocked in such a way that the arms 160 (Figs. 6 and 12) come opposite the locking slides 151, thus locking the control keys 11 until the cam 45 has terminated a full revolution (i. e. two machine operations). During the course of this operation, the time set on the keyboard is accumulated in the automatically selected totalizer $a_1 b_1$, whilst the totalizer determined by depressing the key 11 is not used.

At the end of the operation $a_1$, the slide 63 (Fig. 6) is moved downwards by the groove 45a of the cam 45, to such an extent that the key stem 13 is disengaged from the motor key 12 and the index 220 is positioned on "salary". The control keys 11 are not influenced by the general release device. Even the release key 158 (Fig. 12) can only be actuated after the complete series of operations is terminated, since the locking slides 151 are locked during all the operations of the series, so that the depressed key 11 is kept in the depressed position. When the key stem 13 is released, the spring 182 (Fig. 18) causes the cam 181 to be returned to its initial position, so that the spring 184 returns the coupling pinion 193 into mesh with the gear wheels 194 and 195, whereby the throw in device 207—208 for the disengaged rows of totalizers is again connected with the mode of operation cams 201—205.

For the recording of the salary, the corresponding amount is set by means of the amount keys 10, and the second operation $a_2$ of the series is released by depressing the motor key 12; but, in this case, neither of the key stems 13, 15 is coupled therewith, so that only the totalizer $a_2 b_2$, which is in the zero position, and the callings totalizer corresponding to the depressed key 11, are selected, and the amount of salary set is accumulated during this machine operation in these two totalizers.

At the end of the operation $a_2$, the groove 45a of the cam 45 causes the slide 63 to be returned to its initial position (Fig. 6) in which the key stem 13 is again connected with the motor key 12 and the index 220 brought to "time". Since the cam 45 has made a complete revolution at the end of this operation, the roller of the crank lever 89 falls into the notch 94 of the cam 45, so that the arms 160 are removed from the paths of the locking slides 151 by the spring 163. In the same manner, the projection 146$^1$ (Fig. 6) causes the key 11 to be released.

After the whole of the salaries for manual items of work have been booked and the total thereof calculated in the totalizer $a_2$, $b_2$, the lever 4 is positioned on "total salary", thus selecting the totalizer $a_2 b_2$, determining the "zeroizing" operation and depressing the key stem 112. On depressing the total taking key 16, the machine is released for an operation in which the total of all salaries for manual items of work is taken from the totalizer $a_2 b_2$ and transferred to the grand totalizer G.

Salary analysis

The total time expended in a given period on manual and mechanical items of work and the total of the special overheads are obtained by zeroizing the respective totalizers $a_1 b_1$ and $b_3$. To do this the lever 4 is positioned either on "total time" ($\Sigma a_1 b_1$) or on "overheads" ($\Sigma b_3$) total taking key 16 being depressed, in the latter case the total being transferred from the totalizer $b_3$ to the grand totalizer G.

By positioning the lever 4 on "addition" and the lever 5 on "zeroizing", it is possible by using the total taking key 16 to take at any time the total from all the remaining totalizers I to XVIII, $b_2$ and G and to determine how the total expenditure on salaries (G) is subdivided between mechanical items of work ($b_2$), overheads for mechanical items of work ($b_3$), salaries for manual items of work $\Sigma(a_2 b_2 - b_z)$ or $\Sigma$I-XVIII and between the different groups of callings.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

I claim:

1. In a machine of the class described adapted to be controlled for a series of related operations, totalizer keys, a key depressing bar, and selecting mechanism for selectively connecting the keys to the bar in a predetermined succession during a related series of operations.

2. In a machine of the class described, totalizer keys, a motor bar, selecting mechanical operable through a plurality of related cycles and including means to selectively couple the keys to the motor bar in predetermined sequence, and means to control the selecting mechanism to couple the keys in a different predetermined sequence.

3. In a machine of the class described, means to automatically control the selection of totalizers in predetermined sequence, said means including two rotatable controlling cams and an actuator therefor, the two cams being so connected with each other that when either is held against operation the other will be given a complete rotation upon a predetermined series of operations of the actuator.

4. In a machine of the class described, means to control the selection of totalizers, drive means for the control means, a motor key, and means operated by depression of the motor key to disconnect the drive means from the control means.

5. In a machine of the class described, depressible totalizer keys, a means to control the selection of a different totalizer during each of a predetermined number of successive operations, and means for locking the totalizer keys in depressed position until said predetermined number of successive operations are completed.

6. In a machine of the class described, means to control sequential selection of totalizers for successive operations, the means including members adapted to control the sequential selection for different numbers of operations.

7. In a machine of the class described, a plurality of keys, a plurality of control elements, sequence control means normally operable to select the control elements during a predetermined number of operations and in a fixed succession, and means controlled by the depression of one of the said keys for causing the sequence control means to be effective during a different predetermined number of operations to select the control elements according to a different fixed succession.

8. In a machine of the class described, the combination of a plurality of control elements located in different banks, a manipulative member, and means coacting with the elements and the member to selectively couple said elements to the member for operation thereby in a predetermined, fixed order.

9. In a machine of the class described adapted to perform serial operations of two or three distinct related operations, the combination of totalizer keys and means to control the selection of said keys including a pair of interconnected cams and an actuator therefor, one of said cams being operable to control the selections in two operation series and the other of said cams being operable to control the selections in three operation series.

10. In a machine of the class described, the combination of keys situated in one bank, a key situated in another bank, a motor bar, and means for selectively coupling the keys in the said banks to the motor bar, said means coupling the keys to the bar in a predetermined, fixed succession.

11. In a machine of the class described, a plurality of banks of totalizer keys, a motor bar, means normally connecting a key of one of said banks to the motor bar for operation thereby and for holding the key depressed when depressed by said motor bar, means for operating the keys in the other bank by the motor bar, and means operable upon depression of any of the keys in said other bank to disable the connecting means between the motor bar and the key in said one bank whereby the key is released from the motor bar and is free to return to its undepressed position.

12. In a machine of the class described adapted to be controlled for a series of related operations, totalizer keys, a key depressing bar, coupling elements to couple a totalizer key to the key depressing bar prior to a machine operation, and means to adjust the coupling elements to selectively couple the keys to the bar in a predetermined succession during a related series of operations.

13. In a machine of the class described adapted to be controlled for a series of related operations, totalizer keys, a key depressing bar, coupling elements to couple a totalizer key to the key depressing bar prior to a machine operation, a cam operable during each operation of a series of related operations, and connections operated by the cam to adjust the coupling elements to connect a different key to the bar for each operation of a related series of operations.

14. In a machine of the class described adapted to be controlled for a series of related operations, totalizer keys, a key depressing bar, a settable means, a coupling pawl mounted on the settable means to couple each key to the bar, one of the coupling pawls normally coupling its associated key to the bar, and means operable during an operation of the machine initiated upon depression of the bar and the normally coupled key to shift the settable means, whereby the normally coupled key is uncoupled and another key is coupled to the bar for a subsequent machine operation.

15. In a machine of the class described adapted to be controlled for a series of related operations, totalizer keys, a key depressing bar, a settable means, a coupling pawl mounted on the settable means to couple each key to the bar, one of the coupling pawls normally coupling its associated key to the bar, means operable during an operation of the machine initiated upon depression of the bar and the normally coupled key to shift the settable means, whereby the normally coupled key is uncoupled and another key is coupled to the bar for a subsequent machine operation, said means operable step by step according to the series of related operations, and mechanism to actuate said means one step for each of the series of related operations.

16. In a machine of the class described adapted to be controlled for a series of related operations, totalizer keys, a key depressing bar, a settable means, a coupling pawl mounted on the settable means to couple each key to the bar, one of the coupling pawls normally coupling its associated key to the bar, means operable during an operation of the machine initiated upon depression of the bar and the normally coupled key to shift the settable means, whereby the normally coupled key is uncoupled and another key is coupled to the bar for a subsequent machine operation, said means operable through one complete operation during each series of related operations, and means to operate the means an equal extent during each operation of the related series of operations.

17. In a machine of the class described, the combination of totalizer selection keys; means to automatically depress the keys in a predetermined sequence, said means including two rotatable controlling cams, an actuator for the cams, and a planetary gear connection between the two cams; and means to hold one cam against operation whereby when one cam is held against operation the other will be given a complete rotation upon a predetermined series of operations of the actuator.

18. In a machine of the class described, means to automatically control the selection of totalizers in predetermined sequence, said means including two rotatable controlling cams and an actuator therefor, the two cams being so connected with each other that when either is held against operation the other will be given a complete rotation upon a predetermined series of operations of the actuator, and a manipulative device to predetermine which cam is to be held against operation.

19. In a machine of the class described, the combination of means to automatically control the selection of totalizers in predetermined sequence, said means including two cams adapted to receive a plurality of steps of movement for a series of related operations of the machine, one cam adapted to receive a greater number of steps of movement for a series of related operations than the other, and an actuator for the cams; a connection between the cams whereby when either cam is held against operation the other is given a complete rotation upon a predetermined series of operations of the actuator, and a manipulative device to release one of the cams and hold the other against operation to predetermine the number of related operations for a series of operations.

ERNST BREITLING.